US012711890B2

(12) United States Patent
Zhai

(10) Patent No.: US 12,711,890 B2
(45) Date of Patent: Aug. 18, 2026

(54) DISPLAY PANEL AND BRIGHTNESS COMPENSATION METHOD, CHIP AND DISPLAY DEVICE THEREOF

(71) Applicant: Tianma Advanced Display Technology Institute (Xiamen) Co., Ltd., Xiamen (CN)

(72) Inventor: Yingteng Zhai, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 64 days.

(21) Appl. No.: 18/883,204

(22) Filed: Sep. 12, 2024

(65) Prior Publication Data

US 2026/0004696 A1 Jan. 1, 2026

(30) Foreign Application Priority Data

Jun. 28, 2024 (CN) ......................... 202410867094.6

(51) Int. Cl.
*G09G 3/20* (2006.01)

(52) U.S. Cl.
CPC ... *G09G 3/2007* (2013.01); *G09G 2320/0223* (2013.01); *G09G 2320/0233* (2013.01); *G09G 2320/041* (2013.01)

(58) Field of Classification Search
None
See application file for complete search history.

(56) References Cited

U.S. PATENT DOCUMENTS

2021/0366392 A1* 11/2021 Hong ..................... G09G 3/006
2024/0404447 A1* 12/2024 Chen .................... G09G 3/2007

FOREIGN PATENT DOCUMENTS

WO WO-2013058260 A1 * 4/2013 ........... G09G 3/3648
WO 2024065392 A1 4/2024

* cited by examiner

*Primary Examiner* — Kenneth Bukowski

(74) *Attorney, Agent, or Firm* — Anova Law Group, PLLC

(57) ABSTRACT

The present disclosure discloses a display panel. The display panel includes a plurality of preset regions. A preset region of the plurality of preset regions includes at least one first pixel. When the display panel is in a first state, a data voltage received by the first pixel is related to a Gamma curve corresponding to at least one preset region adjacent to a preset region where the first pixel is located.

27 Claims, 20 Drawing Sheets

DISPLAY PANEL AND BRIGHTNESS COMPENSATION METHOD, CHIP AND DISPLAY DEVICE THEREOF

CROSS-REFERENCES TO RELATED APPLICATIONS

The present disclosure claims priority to Chinese Patent Application No. 202410867094.6, filed on Jun. 28, 2024, the content of which is incorporated herein by reference in its entirety.

TECHNICAL FIELD

The present disclosure relates to the field of display technology, and more specifically, relates to a display panel and its brightness compensation method, chip, and display device.

BACKGROUND

With the development of display technology, users have increasingly high requirements for the display effect of screens. Among these, the display uniformity of the screen is one of the important indicators for measuring the display effect of the display screen. How to improve the display effect has become an urgent problem to be solved.

SUMMARY

One aspect of the present disclosure provides a display panel. The display panel includes a plurality of preset regions. A preset region of the plurality of preset regions includes at least one first pixel. When the display panel is in a first state, a data voltage received by the first pixel is related to a Gamma curve corresponding to at least one preset region adjacent to a preset region where the first pixel is located.

Another aspect of the present disclosure provides a brightness compensation method for a display panel which includes a plurality of preset regions. The method includes determining an associated preset region corresponding to a target image pixel based on the target image pixel in a to-be-displayed image. The associated preset region is adjacent to a preset region where a first pixel is located, where the first pixel is required for displaying the target image pixel in the display panel. The method further includes obtaining an associated preset data voltage corresponding to the associated preset region based on a Gamma curve corresponding to the associated preset region and obtaining a target data voltage at least based on the associated preset data voltage. The target data voltage is a data voltage transmitted to the first pixel corresponding to the target image pixel when the to-be-displayed image is displayed.

Still another aspect of the present disclosure provides a chip which is used for executing the brightness compensation method provided by the present disclosure.

Still another aspect of the present disclosure provides a display device, which includes the display panel provided by the present disclosure.

BRIEF DESCRIPTION OF THE DRAWINGS

In order to further illustrate the technical solutions in the embodiments of the present disclosure, a brief introduction is provided below for the drawings. Apparently, the drawings in the following description are merely some embodiments of the present disclosure. Those of ordinary skill in the art may also obtain other drawings based on the provided drawings without exerting creative efforts.

DETAILED DESCRIPTION

To better understand the technical solutions of the present disclosure, some embodiments of the present disclosure are described in detail below with reference to the accompanying drawings.

It should be understood that the described embodiments are merely a part of embodiment of the present disclosure and not all of the embodiments. Based on the embodiments in the present disclosure, all other embodiments obtained by those of ordinary skill in the art without making inventive efforts are within the scope of protection of the present disclosure.

The terms used in the embodiments of the present disclosure are merely for the purpose of describing specific embodiments and are not intended to limit the present disclosure. In the embodiments of the present disclosure and the appended claims, the singular forms "a," "an," and "the" are also intended to include plural forms unless the context clearly indicates otherwise.

It should be understood that the term "and/or" used herein is merely an associative relationship describing associated objects, indicating that there may be three kinds of relationships. For example, A and/or B may refer to: existing A alone, existing A and B simultaneously, or existing B alone. In addition, the character "/" used herein generally indicates an "or" relationship between the associated objects before and after it.

In the description of the present specification, it should be understood that the terms "substantially," "approximately," "about," "roughly," and "generally" used in the claims and embodiments of the present disclosure mean that they can be substantially recognized within a reasonable process operation range or tolerance range, rather than an exact value.

It should be understood that although terms like first, second, etc., may be used to describe pixels, regions, etc., in the embodiments of the present disclosure, these should not be limited to these terms. These terms are only used to distinguish pixels, regions, etc., from each other. For example, without departing from the scope of the embodiments of the present disclosure, a first pixel may also be referred to as a second pixel, and similarly, a second pixel may also be referred to as a first pixel. The applicant of this case has provided a solution by conducting detailed and in-depth research on the problems existing in the prior art.

Figure 1:
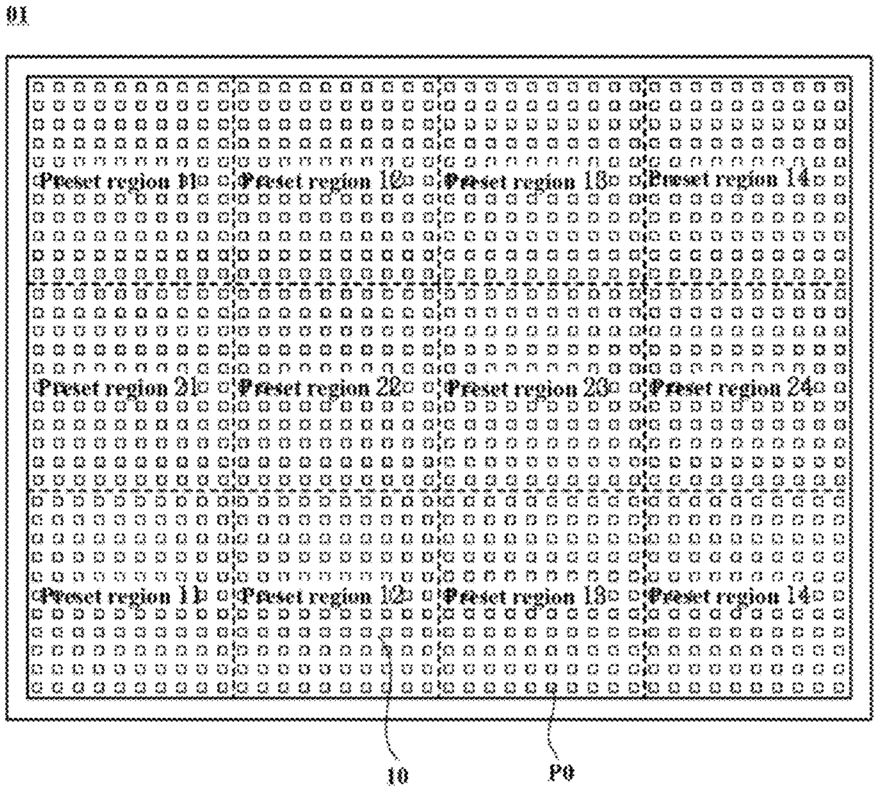
FIG. 1 is a schematic diagram of a display panel provided by an embodiment of the present disclosure.

FIG. 1 is a schematic diagram of a display panel provided by some embodiments of the present disclosure.

Some embodiments of the present disclosure provide a display panel 01. As shown in FIG. 1, the display panel 01 includes a plurality of preset regions 10, each of which includes a plurality of pixels P0. The division of each preset region may be based on the temperature distribution pattern in different areas of the display panel 01 or the distance between different areas of the display panel 01 and the driver IC. Additionally, the preset regions of the display panel 01 provided in the present disclosure may also be divided based on other parameters besides temperature and the distance from the driver IC. For example, as shown in FIG. 1, the display panel 01 is divided into 3*4 preset regions, totaling 12 preset regions, respectively identified as preset region 11, preset region 12, . . . , preset region 14, preset region 21, . . . , preset region 24, preset region 31, . . . , preset region 34.

The inventors have discovered that in the field of large screen displays (e.g., spliced screens), the differentiation in display effects across different display regions is a common issue. The main reason is the significant difference in display signals across different display regions of a large screen display panel. For instance, the temperature of different regions in a large screen display panel may vary greatly, resulting in significant differences in the threshold drift of the transistors included in the pixel circuits of these different regions. This leads to noticeable visual effect differences in different regions of the large screen display panel. Similarly, when there are significant voltage drop differences in the signals received by regions at varying distances from the driver IC in a large screen display panel, noticeable visual effect differences also occur across these regions of the large screen display panel.

To address the aforementioned issues, partitioned driving of large screen displays may be implemented. One specific method is to divide the large screen display panel into a plurality of preset regions 10, each of which may call a corresponding Gamma curve based on its own actual conditions. This means that a data voltage received by at least some of the pixels in the preset regions 10 may be obtained by looking up different display lookup tables (Look Up Table, LUT) according to the actual conditions of the preset regions 10.

That is, to improve the display uniformity across different regions of the display screen, the display area of the display screen may be divided into a plurality of preset regions 10, and the Gamma curve corresponding to each preset region may be selected according to the characteristics of each preset region. This reduces the display brightness differences across the preset regions 10.

For example, when the temperature differences between different regions of a large screen display panel significantly affect visual effects, the large screen display panel may be divided into a plurality of preset regions 10 based on the temperature distribution pattern in different regions of the panel, and the temperature of each preset region 10 may be individually measured. When converting the image data to be displayed into a data voltage that can be read by the display panel 01, the LUT required to convert the image data into data voltages may be determined based on the actual temperature of each preset region 10. When the temperature differences between different preset regions 10 are large and fall into different temperature ranges, the data voltage received by some pixels P0 in these different preset regions 10 may be obtained by looking up different LUTs.

For example, when the visual effect is significantly affected by the distance from the driver IC in different regions of a large screen display panel, the panel may be divided into a plurality of preset regions 10 based on the varying distances from the driver IC, where each preset region 10 has a significantly different distance from the driver IC. When converting the image data to be displayed into a data voltage that can be read by the display panel 01, the LUT required to convert the image data into a data voltage can be determined based on the distance of each preset region 10 from the driver IC. When the distance differences between different preset regions 10 and the driver IC are large and fall into different distance ranges, the data voltage received by these different preset regions 10 may be obtained by looking up different LUTs.

However, the inventors have further discovered that when using the aforementioned partition compensation method for large screen displays, adjacent preset regions 10 may call different Gamma curves, which may lead to brightness discontinuities near the boundaries of adjacent preset regions 10.

It should be noted that in some conventional-sized display panels 01, a partitioned driving method may also be used. For example, the display panel 01 may support split-screen display, where part of the display panel 01 may be used to display high refresh rate images and another part may be used to display low refresh rate images. In this case, the temperature of the part of the display panel 01 used to display high refresh rate images will be significantly higher than the temperature of the part used to display low refresh rate images. Thus, the part of the display panel 01 used to display the high refresh rate images and the part used to display the low refresh rate images may respectively call different gamma curves. Therefore, the inventive concept of the present disclosure may be applied not only to large screen display panels 01 but also to conventional-sized display panels 01.

The display panel 01, at least in a first state, includes different Gamma curves corresponding to at least two of the plurality of preset regions 10. The Gamma curve corresponding to a preset region 10 means that the data voltage received by some pixels P0 in that preset region 10 is obtained by looking up the LUT corresponding to that Gamma curve.

The display panel 01 realizes the display of the screen by presenting brightness corresponding to a limited number of grayscale values. However, due to the human eye's differing sensitivity to light and dark, when the display panel 01 presents the above-mentioned limited number of grayscale values, the relationship between the actual brightness of the display panel 01 and the grayscale value is not linear, thus adapting to the human eye's perception characteristics of light and dark. Existing display panels 01 generally may present grayscale values of 256 from a grayscale value of 0 to a grayscale value of 255. Assuming the screen's maximum brightness is 255 nits, and the grayscale from the grayscale value of 0 to the grayscale value of 255 correspond to 0 to 255 nits, the human eye may discern the brightness change from 0 nits to 1 nit but is hardly able to distinguish the brightness change from 254 nits to 255 nits. Therefore, setting the brightness of the display panel 01 to have a linear relationship with the grayscale value cannot adapt to the visual characteristics of the human eye. That is, setting the data voltage received by the pixel P0 in the display panel 01 to have a linear relationship with the grayscale value cannot adapt to the visual characteristics of the human eye. Thus, the brightness displayed by the display panel 01 needs to undergo Gamma correction, enabling the human eye to more clearly perceive the brightness corresponding to any different grayscale value.

The Gamma curve characterizes the relationship between the brightness and the grayscale value of the pixels P0 in the display panel 01, usually as an exponential function. It should be noted that the brightness of the pixels P0 in the display panel 01 has a linear relationship with the data voltage they receive, so the Gamma curve is actually used to characterize the relationship between the data voltage received by the pixels P0 in the display panel 01 and the grayscale value. Gamma correction converts a grayscale value of the image pixel in the to-be-displayed image into a data voltage according to the Gamma curve, and the data voltage obtained after Gamma correction is exponentially related to the grayscale value.

Gamma correction is typically performed by the central control board (timer control register, TCON). The commonly referred Gamma curve is actually a LUT stored in the register of TCON, and the LUT includes the mapping relationship between the grayscale values and the data voltages obtained according to the preset Gamma curve. Gamma correction involves looking up the data voltage corresponding to the grayscale value of the image pixel to be displayed in the corresponding LUT. When the display panel displays the to-be-displayed image, the pixel in the display panel used to display the image pixel receives the data voltage. It should be noted that different Gamma curves result in different mapping relationships between grayscale values and data voltages, so different Gamma curves correspond to different LUTs.

Figure 2:
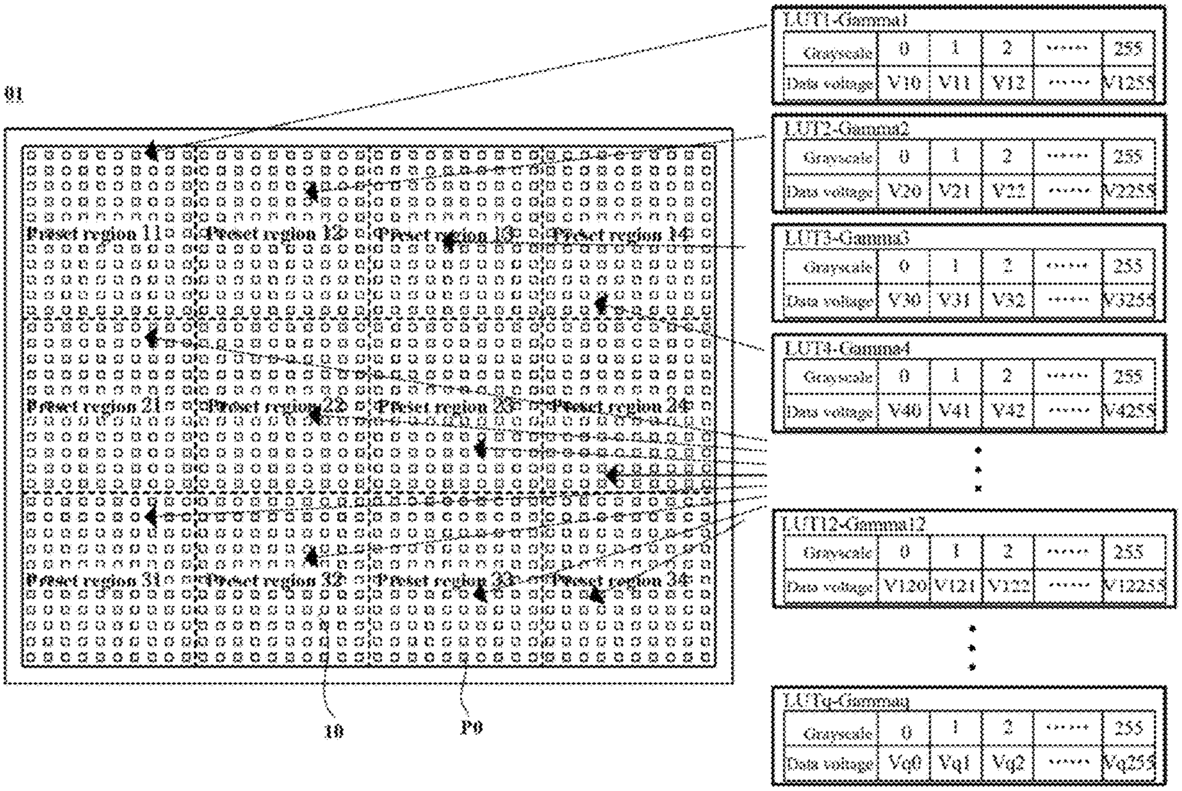
FIG. 2 is a schematic diagram of a corresponding relationship between a display panel and Gamma curves provided by an embodiment of the present disclosure.

FIG. 2 is a schematic diagram of a corresponding relationship between a display panel and Gamma curves provided by an embodiment of the present disclosure.

Take the example where a plurality of preset regions 10 of a display panel 01 are divided based on a temperature distribution pattern of the display panel 01. When the display panel 01 is in a first state, the temperatures corresponding to preset region 11, preset region 12, . . . , preset region 34 may fall into different temperature ranges. As shown in FIG. 2, preset region 11, preset region 12, . . . , preset region 34 correspond to Gamma1 curve, Gamma2 curve, . . . , Gamma12 curve, respectively. That is, the data voltage received by some pixels P0 in preset region 11, the data voltage received by some pixels P0 in preset region 12, . . . , the data voltage received by some pixels P0 in preset region 34 are obtained by looking up LUT1, LUT2, . . . , LUT12, respectively, where LUT1, LUT2, . . . , LUT12 correspond to Gamma1 curve, Gamma2 curve, . . . , Gamma12 curve, respectively.

It should be noted that the total number of Gamma curves that the display panel 01 may call is not necessarily related to the number of preset regions 10. The total number of Gamma curves that the display panel 01 may call can be less than, greater than, or equal to the number of preset regions 10. The total number of Gamma curves that the display panel 01 may call is mainly related to the number of temperature ranges of the display panel 01. For example, if the temperatures of all preset regions 10 of the display panel 01 may be divided into q temperature ranges, the display panel 01 may call Gamma1 curve, Gamma2 curve, . . . , Gammaq curve. Correspondingly, the register of TCON can store a total of q LUTs, LUT1, LUT2, . . . , LUTq.

Figure 3:
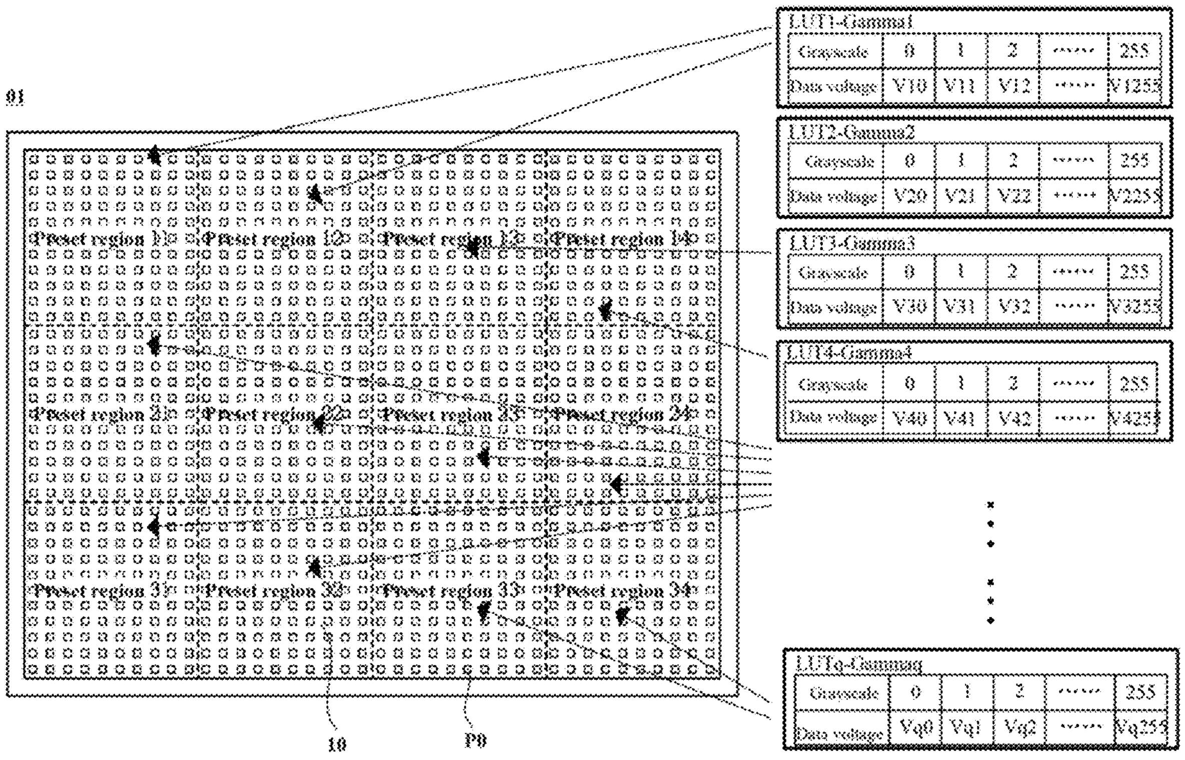
FIG. 3 is a schematic diagram of a corresponding relationship between a display panel and Gamma curves provided by an embodiment of the present disclosure.

FIG. 3 is a schematic diagram of a corresponding relationship between a display panel and Gamma curves provided by an embodiment of the present disclosure.

In a technical solution corresponding to the present disclosure, when a display panel 01 is in a first state, the temperatures corresponding to some preset regions 10 of a plurality of preset regions 10 included in the display panel 01 may fall within the same temperature range. The Gamma curves corresponding to preset regions 10 within the same temperature range may be the same. For example, as shown in FIG. 3, when the display panel 01 is in the first state, the temperatures of preset region 11 and preset region 12 fall within the same temperature range. Therefore, preset region 11 and preset region 12 may both correspond to Gamma1 curve, meaning that the data voltage received by some pixels P0 in preset region 11 and the data voltage received by some pixels P0 in preset region 12 are all preset data voltages obtained by looking up LUT1. Similarly, the temperatures of preset region 33 and preset region 34 fall within the same temperature range, so preset region 33 and preset region 34 may both correspond to Gammaq curve, meaning that the data voltage received by some pixels P0 in preset region 33 and the data voltage received by some pixels P0 in preset region 34 are all preset data voltages obtained by looking up LUTq.

Figure 4:
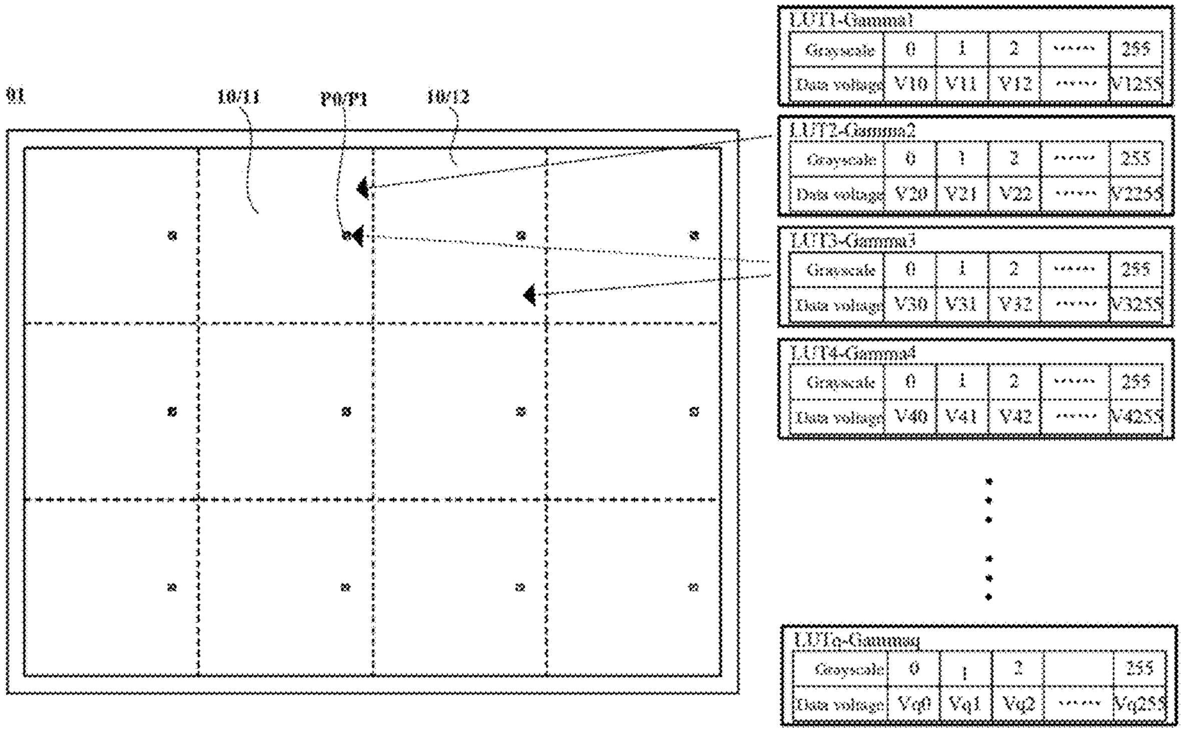
FIG. 4 is a schematic diagram of a corresponding relationship between a first pixel and a Gamma curve in a display panel provided by an embodiment of the present disclosure.

FIG. 4 is a schematic diagram of a corresponding relationship between a first pixel and Gamma curves in a display panel provided by an embodiment of the present disclosure.

In some embodiments of the present disclosure, as shown in FIG. 4, a preset region 10 includes at least one first pixel P1, meaning that at least one of a plurality of pixels P0 included in the preset region 10 is the first pixel P1. When a display panel 01 is in a first state, a data voltage received by the first pixel P1 is not a preset data voltage directly obtained by looking up the LUT corresponding to the Gamma curve of the preset region where the first pixel P1 is located. Instead, the data voltage received by the first pixel P1 is related to the Gamma curve corresponding to at least one preset region adjacent to the preset region where the first pixel P1 is located.

Refer to FIG. 4, a plurality of preset regions 10 in the display panel 01 include an adjacent first preset region 11 and a second preset region 12. When the display panel 01 is in the first state, the data voltage received by the first pixel P1 in the first preset region 11 is at least related to the Gamma curve corresponding to the second preset region 12.

The solid lines with arrows in FIG. 4 represent the relationship between the preset regions 10 and the Gamma curves, indicating the associative relationship between the preset regions 10 and the Gamma curves at each end of the solid lines with arrows. The dashed lines with arrows indicate the relationship between the data voltage received by the first pixel P1 and the Gamma curve, representing the associative relationship between the first pixel P1 and the Gamma curve at each end of the dashed lines with arrows. The same meanings of the solid lines with arrows and dashed lines with arrows apply in similar figures.

As shown in FIG. 4, when the display panel 01 is in the first state, the first preset region 11 corresponds to the Gamma2 curve, and the second preset region 12 corresponds to the Gamma3 curve. At least one first pixel P1 in the first preset region 11 is related to the Gamma3 curve corresponding to the second preset region 12. Since the Gamma3 curve corresponding to the second preset region 12 directly determines the display brightness of some pixels P0 in the second preset region 12, when the display panel 01 is in the first state, the brightness displayed by at least one first pixel P1 in the first preset region 11 is related to the display brightness of some pixels P0 in the second preset region 12. Therefore, the problem of brightness discontinuities between the adjacent first preset region 11 and the second preset region 12 can be alleviated.

Therefore, in some embodiments of the present disclosure, when the display panel 01 is in the first state, the data voltage received by the first pixel P1 is related to the Gamma curve corresponding to at least one preset region adjacent to the preset region where the first pixel P1 is located, so that the problem of brightness discontinuities between the preset region where the first pixel P1 is located and the adjacent preset region may be alleviated. This results in better brightness uniformity when the display panel 01 is in the first state.

For clarity, FIG. 4 only illustrates the relationship between the data voltage received by one first pixel P1 in the first preset region 11 and the Gamma curve. It should be noted that the display panel 01 includes the plurality of preset regions 10, each of which may include at least one first pixel P1. The data voltage received by the first pixel P1 in each preset region 10 may be related to the Gamma curve corresponding to at least one adjacent preset region. Furthermore, each preset region 10 may include a plurality of first pixels P1, and the data voltage received by each first pixel P1 in the same preset region 10 may be related to the Gamma curve corresponding to at least one adjacent preset region.

For ease of description, at least part of the preset regions 10 adjacent to the preset region 10 where the first pixel P1 is located are named associated preset regions 10. The data voltage received by the first pixel P1 is related to the Gamma curve corresponding to the associated preset regions. It can be understood that different first pixels P1 may have different associated preset regions. For example, in conjunction with FIGS. 3 and 4, one or more of preset region 12, preset region 21, and preset region 22 adjacent to preset region 11 can be the associated preset region 10 corresponding to the first pixel P1 in preset region 11. One or more of preset region 11, preset region 12, preset region 13, preset region 21, preset region 23, preset region 31, preset region 32, and preset region 33 adjacent to preset region 22 can be the associated preset region 10 corresponding to the first pixel P1 in preset region 22.

Figure 5:
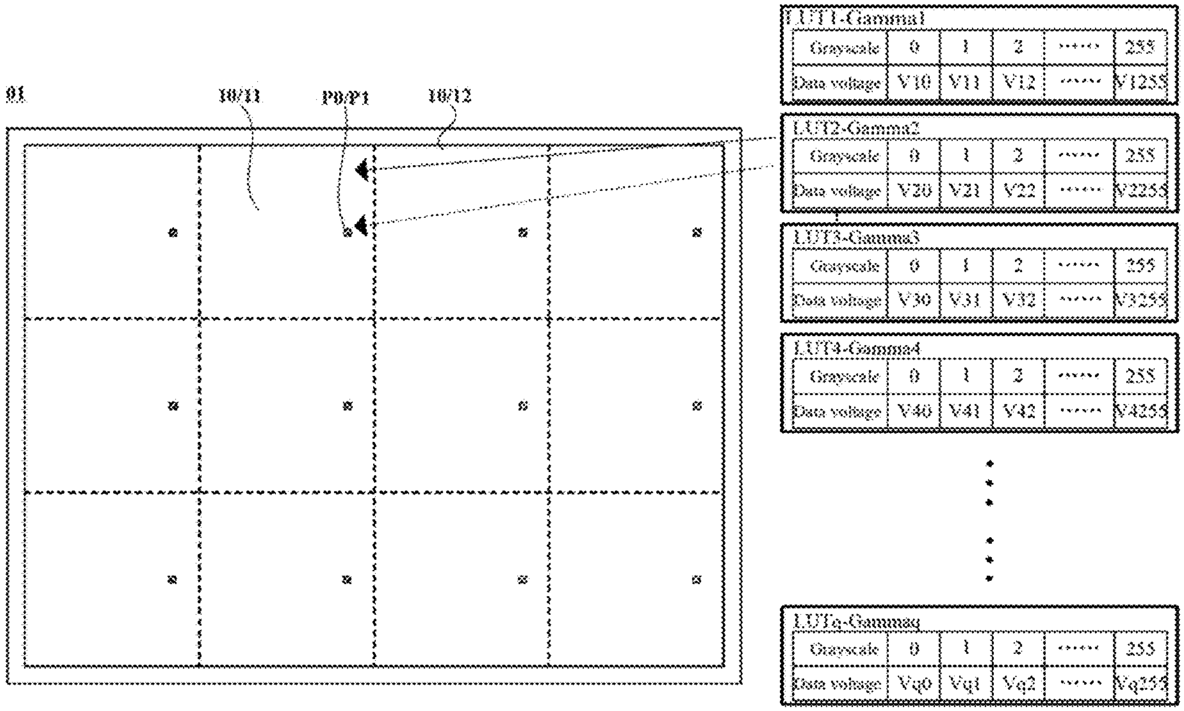
FIG. 5 is a schematic diagram of a corresponding relationship between a first pixel and a Gamma curve in a display panel provided by an embodiment of the present disclosure.

FIG. 5 is a schematic diagram of a corresponding relationship between a first pixel and Gamma curves in a display panel provided by an embodiment of the present disclosure. FIG. 5 illustrates a corresponding relationship between a first pixel and Gamma curves when the display panel 01 is in a second state, while FIG. 4 illustrates a corresponding relationship between a first pixel and Gamma curves when the display panel 01 is in a first state.

In a technical solution, as shown in FIG. 5, when a display panel 01 is in a second state, a data voltage received by a first pixel P1 may be directly obtained from a Gamma curve corresponding to a preset region 10 where the first pixel P1 is located. That is, when the display panel 01 is in the second state, the data voltage received by the first pixel P1 may be a preset data voltage obtained by looking up a LUT corresponding to the preset region 10 where the first pixel P1 is located. The preset data voltage is unrelated to Gamma curves of other adjacent preset regions 10. As shown in FIG. 5, when the display panel 01 is in the second state, a data voltage received by any pixel P0 in a first preset region 11, including the first pixel P1, is the preset data voltage obtained by looking up the LUT corresponding to the first preset region 11.

In this technical solution, a method for obtaining a data voltage received by a first pixel P1 in a preset region 10 may be determined based on a specific state of a display panel 01. When a display panel 01 is in a first state, as shown in FIG. 4, a data voltage received by a first pixel P1 in a preset region 10 needs to be associated with Gamma curves of associated preset regions 10 corresponding to the first pixel P1 to ensure better brightness uniformity between different preset regions 10. When a display panel 01 is in a second state, as shown in FIG. 5, a data voltage received by a first pixel P1 in a preset region 10 is related to a Gamma curve corresponding to the preset region 10 where the first pixel P1 is located and does not need to be associated with Gamma curves corresponding to other preset regions 10. This can avoid excessively increasing the computational load for driving the display panel 01.

Figure 9:
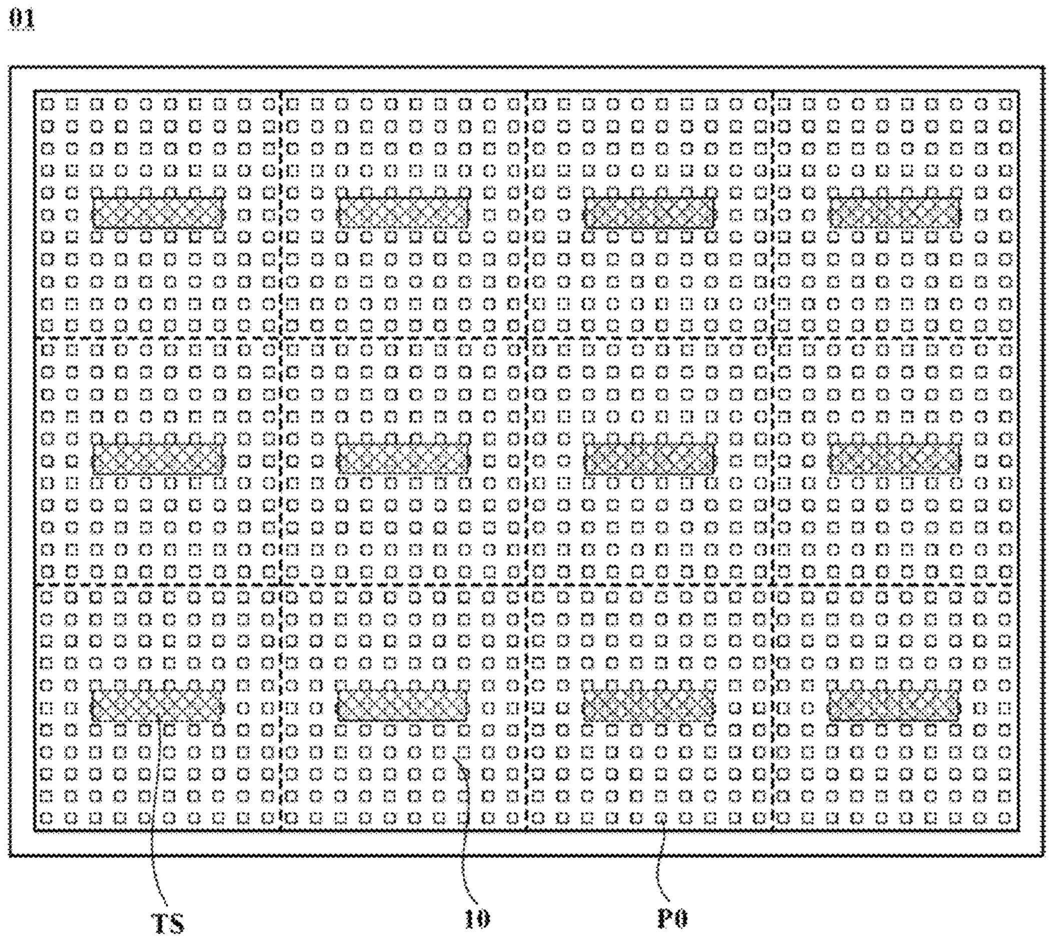
FIG. 9 is a schematic diagram of a display panel provided by an embodiment of the present disclosure.

It should be noted that when a display panel 01 is in a first state, a data voltage received by a first pixel P1 in a preset region 10 may be related not only to a Gamma curve of an associated preset region 10 corresponding to the first pixel P1 but also to a Gamma curve corresponding to the preset region 10 where the first pixel P1 is located (as shown in FIG. 9), which will be explained in detail later.

In an embodiment of the present disclosure, when a display panel 01 is in a first state, as shown in FIGS. 2-4, at least two adjacent preset regions 10 correspond to different Gamma curves. For example, when the display panel 01 is in the first state, as shown in FIG. 4, a Gamma curve corresponding to a first preset region 11 is Gamma2 curve, and a Gamma curve corresponding to a second preset region 12 adjacent to the first preset region 11 is Gamma3 curve.

Figure 6:
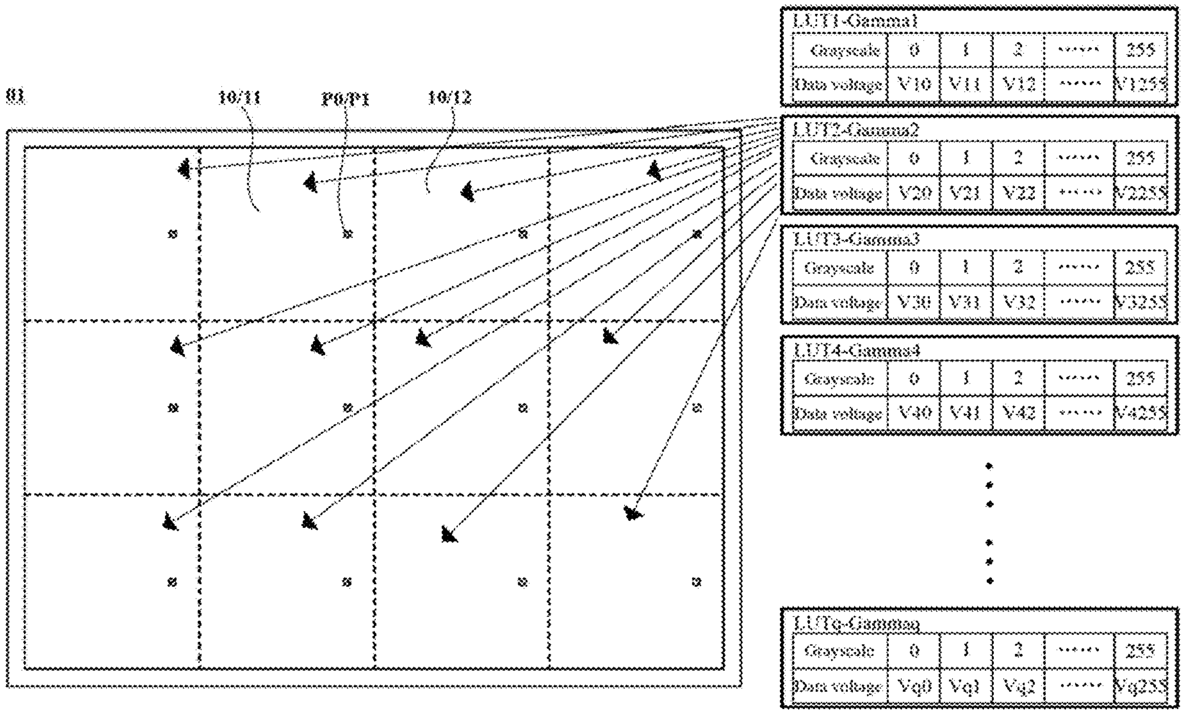
FIG. 6 is a schematic diagram of a corresponding relationship between a display panel and Gamma curves provided by an embodiment of the present disclosure.

FIG. 6 is a schematic diagram of a corresponding relationship between a display panel and Gamma curves provided by an embodiment of the present disclosure. FIG. 6 illustrates a corresponding relationship between a display panel 01 and Gamma curves when the display panel 01 is in a second state.

Additionally, when the display panel 01 is in the second state, as shown in FIG. 6, Gamma curves corresponding to any adjacent preset regions 10 may be the same. For example, as shown in FIG. 6, when the display panel 01 is in the second state, the Gamma curve corresponding to the first preset region 11 is Gamma2 curve, and the Gamma curve corresponding to the second preset region 12 adjacent to the first preset region 11 is also Gamma2 curve. At this time, there is no issue of display unevenness due to different Gamma curves corresponding to different preset regions 10, so the data voltage received by the first pixel P1 in each preset region 10 may be the preset data voltage obtained by looking up the LUT corresponding to each preset region 10.

Figure 7:
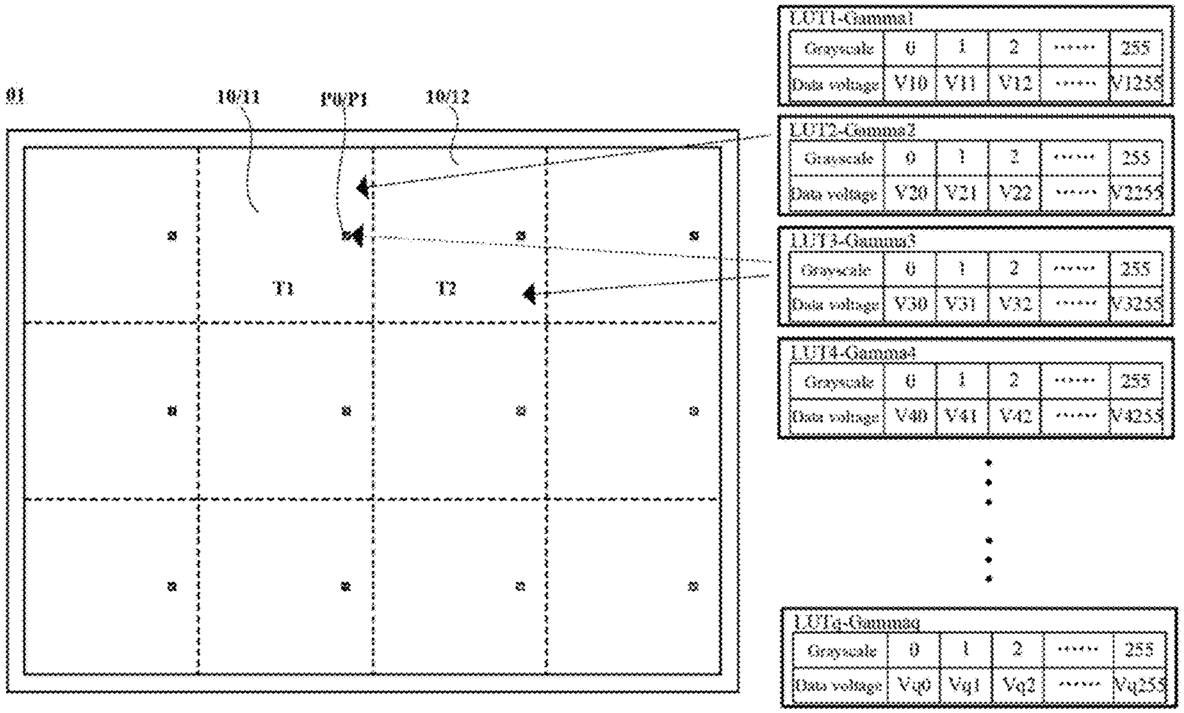
FIG. 7 is a schematic diagram of a corresponding relationship between a display panel and Gamma curves provided by an embodiment of the present disclosure.
Figure 8:
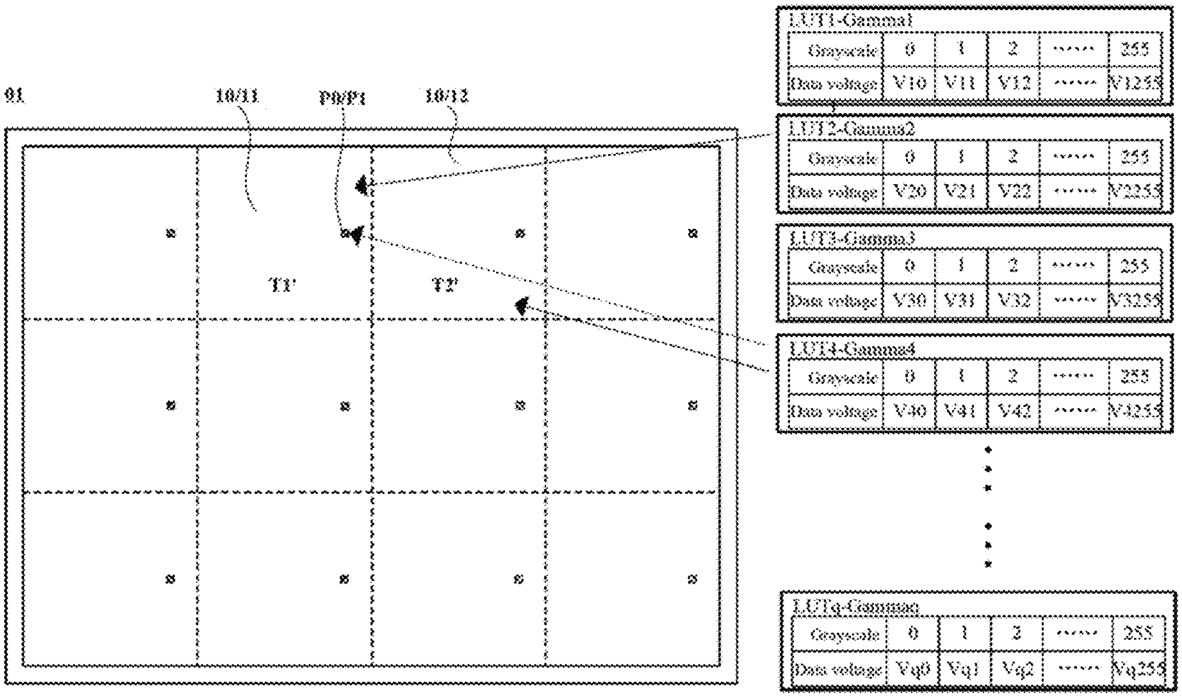
FIG. 8 is a schematic diagram of a corresponding relationship between a display panel and Gamma curves provided by an embodiment of the present disclosure.

FIG. 7 is a schematic diagram of a corresponding relationship between a display panel and Gamma curves provided by an embodiment of the present disclosure. FIG. 8 is a schematic diagram of a corresponding relationship between a display panel and Gamma curves provided by an embodiment of the present disclosure.

In an embodiment of the present disclosure, a plurality of preset regions 10 included in a display panel 01 may be divided based on a temperature distribution pattern of the display panel 01, and Gamma curves corresponding to each preset region are related to its temperature. As shown in FIGS. 7 and 8, when the display panel 01 is in a first state, at least two adjacent preset regions 10 have different temperatures, and Gamma curves corresponding to the at least two adjacent preset regions 10 are different to solve the display unevenness problem caused by different temperatures in the at least two adjacent preset regions 10.

For example, as shown in FIG. 7, when the temperature of the first preset region 11 is T1, the temperature of the second preset region 12 is T2, and T1 and T2 belong to different temperature ranges, the Gamma curve corresponding to the first preset region 11 is different from the Gamma curve corresponding to the second preset region 12. Illustratively, the Gamma curve corresponding to the first preset region 11 can be Gamma2 curve, and the Gamma curve corresponding to the second preset region 12 can be Gamma3 curve.

For example, as shown in FIG. 8, when the temperature of the first preset region 11 is T1', the temperature of the second preset region 12 is T2', and T1' and T2' belong to different temperature ranges, the Gamma curve corresponding to the first preset region 11 is different from the Gamma curve corresponding to the second preset region 12. Illustratively, the Gamma curve corresponding to the first preset region 11 can be Gamma2 curve, and the Gamma curve corresponding to the second preset region 12 can be Gamma4 curve.

It should be noted that the temperature of the preset regions 10 is not necessarily constant, and thus the corresponding Gamma curves are not necessarily constant. For example, in conjunction with FIGS. 7 and 8, when the temperature of the second preset region 12 is T2 and T2' respectively, and T2 and T2' belong to different temperature ranges, the Gamma curve corresponding to the second preset region 12 at T2 is different from the Gamma curve corresponding to the second preset region 12 at T2'. The Gamma curve corresponding to the second preset region 12 at these two temperatures may be Gamma3 curve and Gamma4 curve, respectively.

Additionally, when the temperature of the preset region 10 varies within the same temperature range, the corresponding Gamma curve does not change. The temperature range can be divided according to a preset rule. For example, in conjunction with FIGS. 7 and 8, when the temperature of the first preset region 11 is T1 and T1' respectively, and T1 and T1' belong to the same temperature range, the Gamma curve corresponding to the first preset region 11 at T1 is the same as the Gamma curve corresponding to the first preset region 11 at T1'. The Gamma curve corresponding to the first preset region 11 at these two temperatures may both be Gamma2 curve.

When the temperatures of different preset regions 10 fall within the same temperature range, the Gamma curves corresponding to these different preset regions 10 may be the same. Therefore, when the display panel 01 is in a second state, the temperatures of each preset region 10 of the display panel 01 may fall within the same temperature range, meaning that each preset region 10 of the display panel 01 correspond to the same Gamma curve.

It is understood that in some embodiments, the Gamma curve corresponding to a preset region 10 may change according to the state of the preset region 10. It can be seen that the LUT corresponding to the preset region 10 in different states may also be different. For example, when the plurality of preset regions 10 of the display panel 01 are divided based on the temperature distribution pattern of the display panel 01, if the temperature of the same preset region 10 changes and the temperature before and after the change belongs to different temperature ranges, the Gamma curve corresponding to the preset region 10 before and after the temperature change is different. That is, the data voltage received by some pixels P0 in the preset region 10 is obtained by looking up different LUTs.

FIG. 9 is a schematic diagram of a display panel provided by an embodiment of the present disclosure.

In this embodiment, as shown in FIG. 9, a display panel 01 may include a temperature sensor TS, and the temperature sensor TS is used to sense the temperature of each preset region 10, so that TCON determines a Gamma curve corresponding to each preset region 10 based on the temperature sensed by the temperature sensor TS. As shown in FIG. 9, each preset region 10 may have a corresponding temperature sensor TS. For example, a sensor TS is provided near the center position of each preset region 10.

Figure 10:
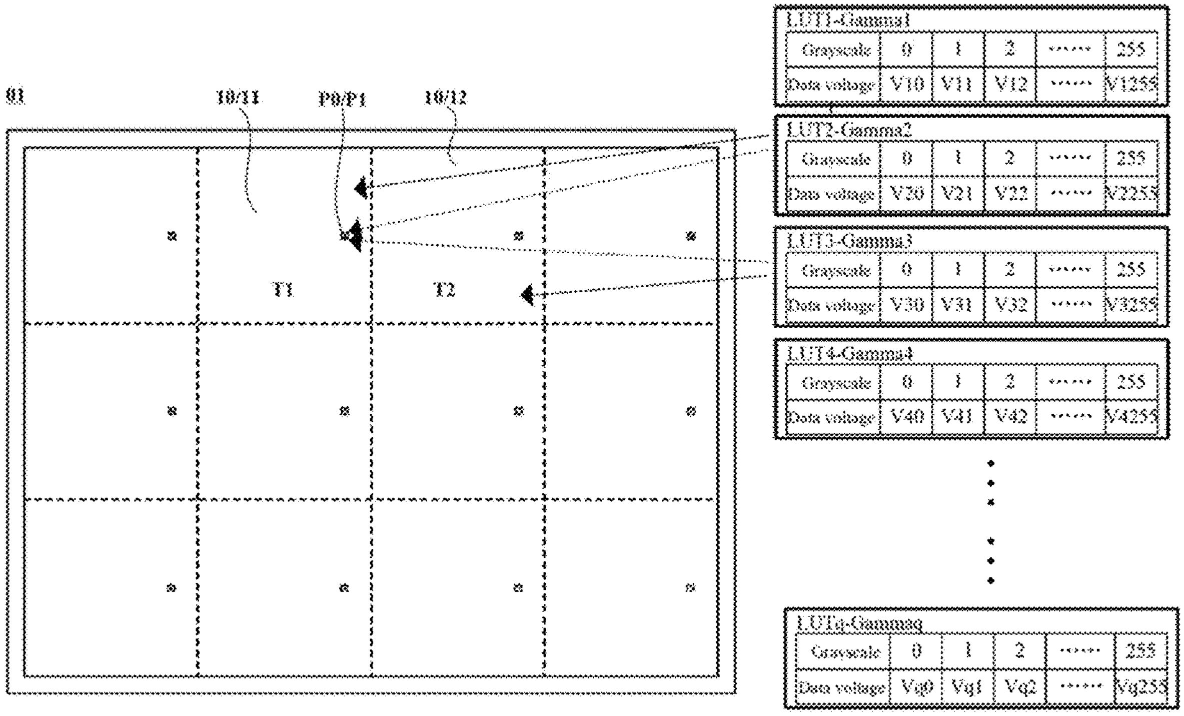
FIG. 10 is a schematic diagram of a corresponding relationship between a display panel and Gamma curves provided by an embodiment of the present disclosure.

FIG. 10 is a schematic diagram of a corresponding relationship between a display panel and Gamma curves provided by an embodiment of the present disclosure.

In this embodiment, a data voltage received by a first pixel P1 is also related to a Gamma curve corresponding to a preset region 10 where the first pixel P1 is located and a grayscale value that the first pixel P1 needs to display.

When the display panel 01 is in a first state, the data voltage received by the first pixel P1 is related to the Gamma curve corresponding to the preset region where the first pixel P1 is located and a Gamma curve corresponding to at least one adjacent preset region 10. That is, the data voltage received by the first pixel P1 is related to the Gamma curve corresponding to the preset region where the first pixel P1 is located and a Gamma curve corresponding to an associated preset region of the first pixel P1.

For example, as shown in FIG. 10, a plurality of preset regions 10 in the display panel 01 include adjacent first preset region 11 and second preset region 12. When the display panel 01 is in the first state, the associated preset region corresponding to the first pixel P1 in the first preset region 11 is the second preset region 12. Therefore, the data voltage received by the first pixel P1 is related to both the Gamma2 curve corresponding to the first preset region 11 and the Gamma3 curve corresponding to the second preset region 12. Since the data voltage received by the first pixel P1 is also related to the grayscale value that the first pixel P1 needs to display, the data voltage received by the first pixel P1 in the first preset region 11 is obtained by integrating the preset data voltage found in LUT2 corresponding to the grayscale value required to be displayed by the first pixel P1 and the preset data voltage found in LUT3 corresponding to the grayscale value required to be displayed by the first pixel P1.

Additionally, when the display panel 01 is in a second state, the data voltage received by the first pixel P1 is the preset data voltage corresponding to the grayscale value required to be displayed by the first pixel P1 found in the LUT corresponding to the preset region 10 where the first pixel P1 is located. For example, as shown in FIG. 5, when the display panel 01 is in a second state, the data voltage received by the first pixel P1 in the first preset region 11 is the preset data voltage corresponding to the grayscale value required to be displayed by the first pixel P1 found in LUT2 corresponding to the first preset region 11.

Figure 11:
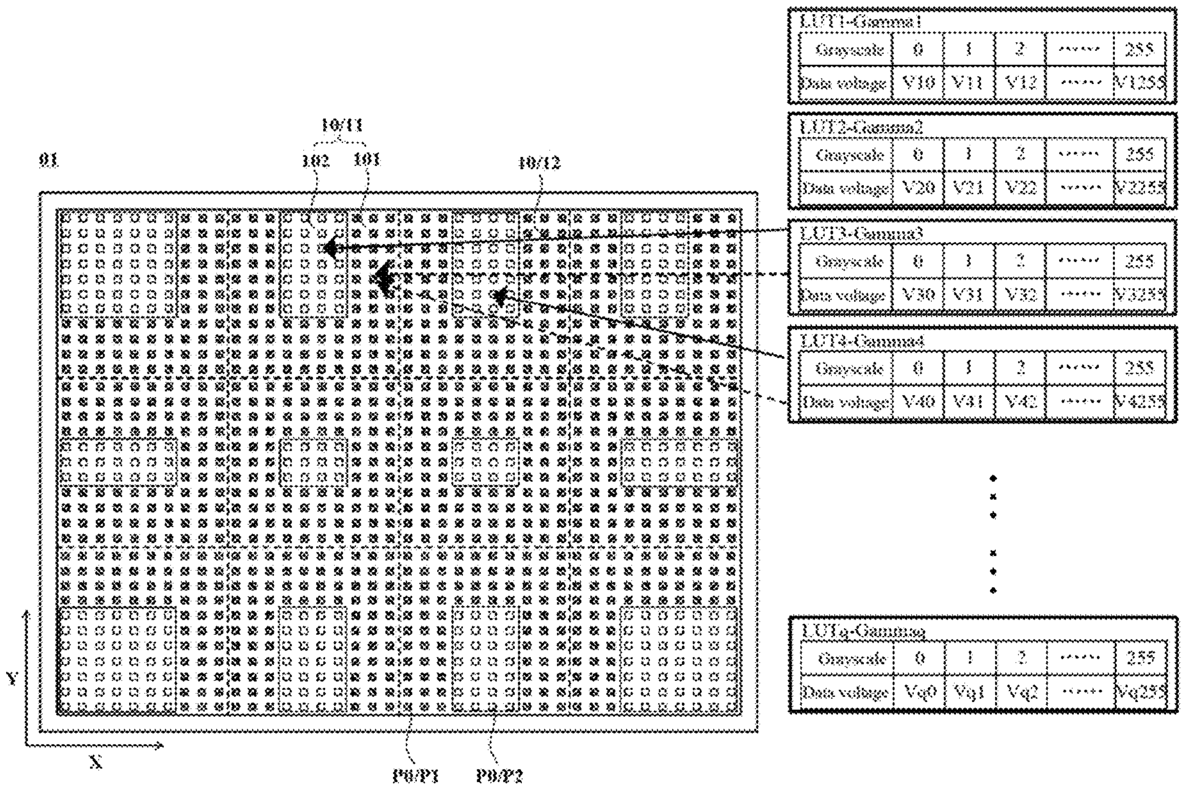
FIG. 11 is a schematic diagram of a corresponding relationship between a display panel and Gamma curves provided by an embodiment of the present disclosure.

FIG. 11 is a schematic diagram of a corresponding relationship between a display panel and Gamma curves provided by an embodiment of the present disclosure.

In an embodiment of the present disclosure, as shown in FIG. 11, a preset region 10 may include a first region 101 and a second region 102. The first region 101 is located on a side of the second region 102 close to an adjacent preset region 10, which means that the second region 102 in the preset region 10 is farther away from the adjacent preset region 10 compared to the first region 101. As shown in FIG. 11, an area surrounded by a solid line in the preset region 10 represents the second region 102, and an area outside the solid line represents the first region 101.

Furthermore, the first pixel P1 is located within the first region 101, and the second region 102 includes at least one second pixel P2. A data voltage received by the second pixel P2 is related to a grayscale value required to be displayed by the second pixel P2 and a Gamma curve corresponding to the preset region where the second pixel P2 is located. That is, the data voltage received by the second pixel P2, which is farther away from the adjacent preset region 10 compared to the first pixel P1 in the preset region 10, is obtained by looking up the LUT corresponding to the preset region 10 where the second pixel P2 is located and finding the preset data voltage corresponding to the grayscale value required to be displayed by the second pixel P2.

Thus, the second region 102 in the preset region 10 may be regarded as a standard emission region, and the first region 101 may be regarded as a compensation emission region. The brightness of the pixel P0 in the standard emission region is determined by the Gamma curve corresponding to the preset region 10 where it is located. This addresses the display unevenness problem caused by significant temperature differences and different distances from the driver IC in different display areas of the display panel 01 in the prior art. The compensation emission region is located between the standard emission regions respectively included in two adjacent preset regions 10. The brightness of the pixel P0 in the compensation emission region is related to Gamma curves of at least part of the adjacent preset regions 10, which means that it is related to the brightness of the standard emission regions in at least part of the adjacent preset regions 10. This addresses the brightness discontinuity problem near the boundary positions of adjacent preset regions 10 when the display panel 01 is in the first state.

In one solution corresponding to this embodiment, the data voltage received by the first pixel P1 included in the first region 101, which is close to the adjacent preset region 10, is related to the Gamma curve corresponding to the preset region 10 and the Gamma curve corresponding to the associated preset region of the first pixel P1. The data voltage received by the second pixel P2 included in the second region 102, which is farther away from the adjacent preset region 10, is related to the Gamma curve corresponding to the preset region 10 and is unrelated to the Gamma curves corresponding to other adjacent preset regions.

For clarity, FIG. 11 only shows the data voltage received by one first pixel P1 included in the first region 101 of the first preset region 11 is related to the Gamma3 curve corresponding to the first preset region 11 and the Gamma4 curve corresponding to the second preset region 12. In this case, the second preset region 12 is the associated preset region corresponding to the first pixel P1 in the first preset region 11. Although FIG. 11 does not illustrate this, the data voltage received by the first pixel P1 in other preset regions 10 is also related to the Gamma curve corresponding to the preset region 10 where the first pixel P1 is located and the Gamma curve corresponding to the associated preset region.

Figure 12:
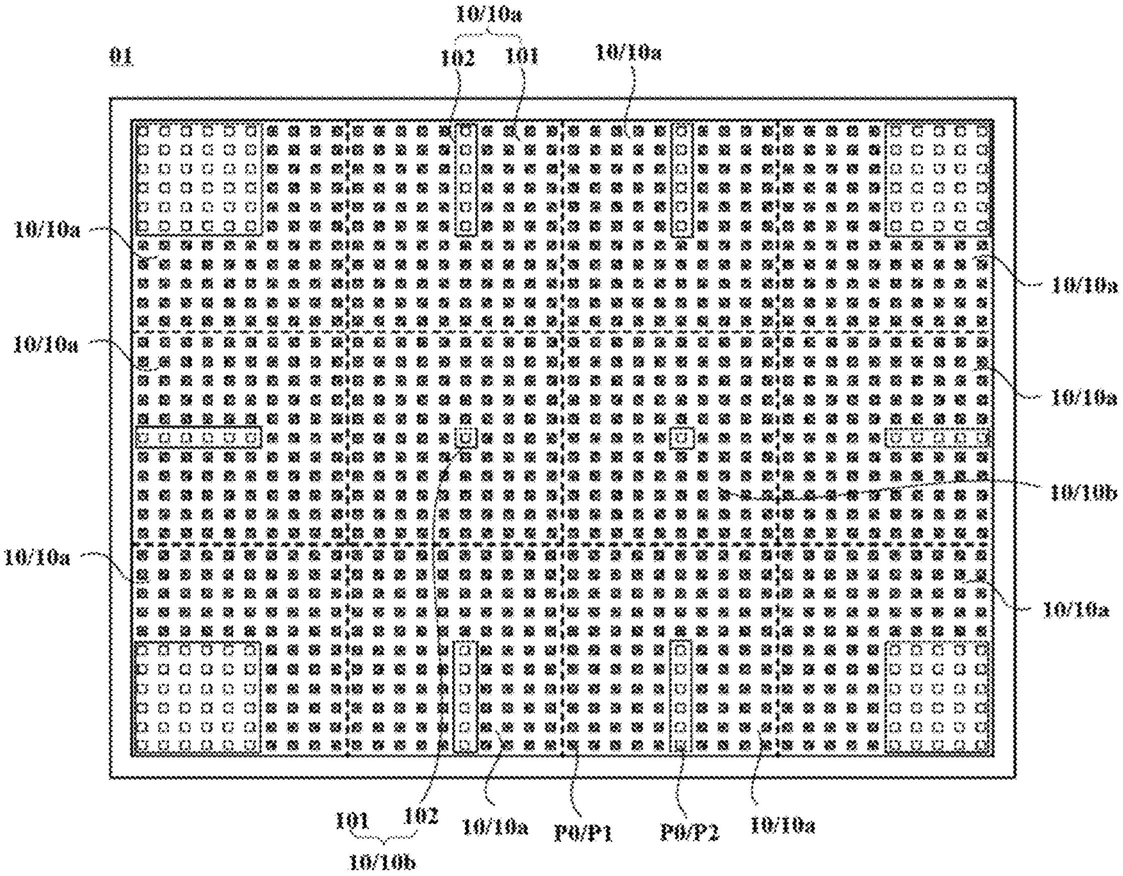
FIG. 12 is a schematic diagram of a display panel provided by an embodiment of the present disclosure.

FIG. 12 is a schematic diagram of a display panel provided by an embodiment of the present disclosure.

In one technical solution corresponding to the present disclosure, as shown in FIG. 12, a second region 102 in at least part of preset regions 10 includes one second pixel P2. A standard emission region in this part of the preset regions 10 includes only one second pixel P2. Correspondingly, the area of a compensation emission region in this part of the preset regions 10 is the largest, and the number of first pixels P1 is the largest, resulting in more uniform brightness changes between adjacent preset regions 10.

One implementation is as shown in FIG. 12. A plurality of preset regions 10 include an edge preset region **10*a* and a non-edge preset region 10*b*. The edge preset region 10*a* is adjacent to the edge of the display panel 01. Therefore, the preset regions 10 adjacent to the edge of the display panel 01 can be designated as edge preset regions 10*a*. The non-edge preset region 10*b* is located on the side of the edge preset region 10*a* away from the edge of the display panel 01. Therefore, the preset regions 10 that are not adjacent to the edge of the display panel 01 can be designated as non-edge preset regions 10*b*. The side of the edge preset regions 10*a* closer to the edge of the display panel 01 is not adjacent to any other preset region 10, and the area of the edge preset regions 10*a* closer to the edge of the display panel 01 can be designated as the second region 102. Therefore, the second region 102 in the edge preset regions 10*a* is located on the side of the first region 101 closer to the edge of the display panel 01, and the second region 102 in the edge preset regions 10*a* includes a plurality of second pixels P2. The second region 102 in the non-edge preset regions 10*b* includes one second pixel P2**.

In one technical solution corresponding to the present disclosure, as shown in FIG. 11. The second region 102 includes at least n1 second pixels P2 arranged in the first direction X and at least m1 second pixels P2 arranged in the second direction Y, where n1 is an integer greater than or equal to 2, and m1 is an integer greater than or equal to 2. Therefore, the standard emission region in each preset region 10 may include a plurality of second pixels P2 arranged in an array. This means that the data voltage received by the plurality of pixels P0 in the preset region 10 is not related to the Gamma curves of adjacent preset regions 10. This solution does not require excessive computational power to drive the display panel 01. For example, as shown in FIG. 11, n1=4, 7; m1=3, 7.

In one implementation, as shown in FIG. 11, the sum of the number of first pixels P1 and second pixels P2 arranged in the preset region 10 along the first direction X is n2, that is, the number of pixels P0 arranged in the preset region along the first direction X is n2, where n1/n2≥⅕. The pixels P0 in the display panel 01 are usually evenly distributed, so for the preset region 10, the width of the standard emission region included in the preset region 10 along the first direction X is greater than or equal to one-fifth of the width of the preset region 10 along the first direction X. For example, as shown in FIG. 11, n1=4, 7; n2=10; n1/n2≥⅕.

And/or, as shown in FIG. 11, the sum of the number of first pixels P1 and second pixels P2 arranged in the preset region along the second direction Y is m2, that is, the number of pixels P0 arranged in the preset region along the second direction Y is m2, where m1/m2≥⅕. The pixels P0 in the display panel 01 are usually evenly distributed, so for the preset region 10, the width of the standard emission region included in the preset region 10 along the second direction Y is greater than or equal to one-fifth of the width of the preset region 10 along the second direction Y. For example, as shown in FIG. 11, m1=3, 7; m2=11; m1/m2≥⅕.

The associated preset region corresponding to the first pixel P1 is relative. Different first pixels P1 in the same preset region 10 may correspond to different associated preset regions. That is, when the display panel 01 is in the first state, the data voltage received by different first pixels P1 in the same preset region 10 may be related to the Gamma curves corresponding to different preset regions 10. The associated preset regions corresponding to the first pixels P1 in different preset regions 10 may also be different. That is, when the display panel 01 is in the first state, the data voltage received by the first pixels P1 in different preset regions 10 may be related to the Gamma curves corresponding to different preset regions 10.

Figure 13:
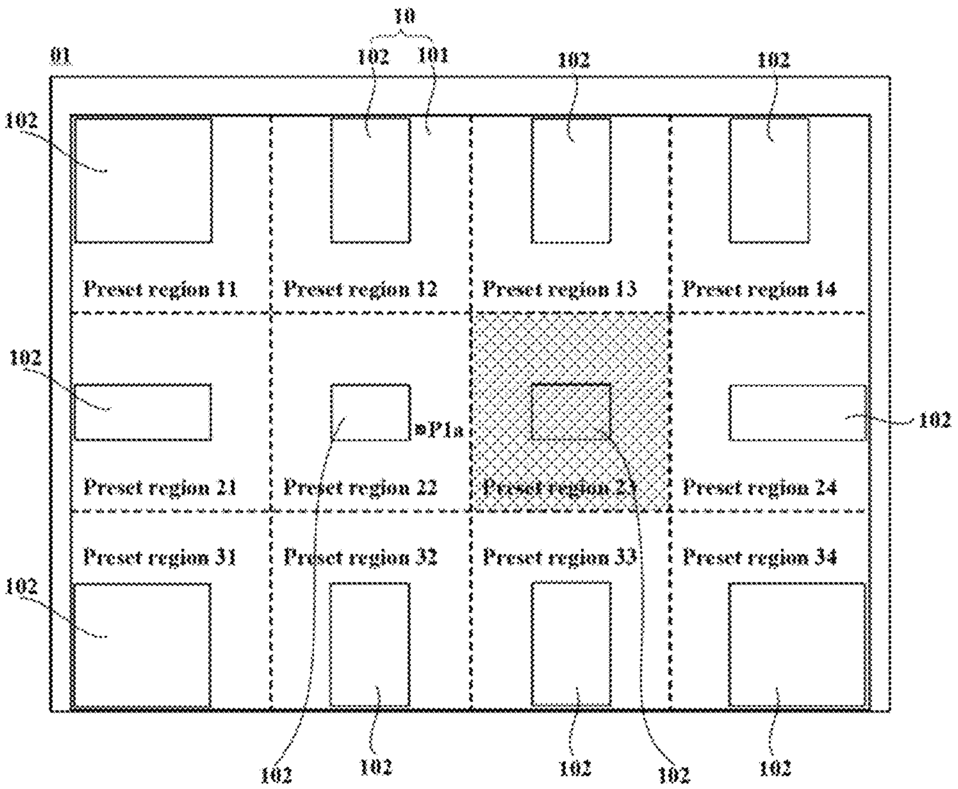
FIG. 13 is a schematic diagram of a first pixel and a corresponding associated preset region in a display panel provided by an embodiment of the present disclosure.
Figure 14:
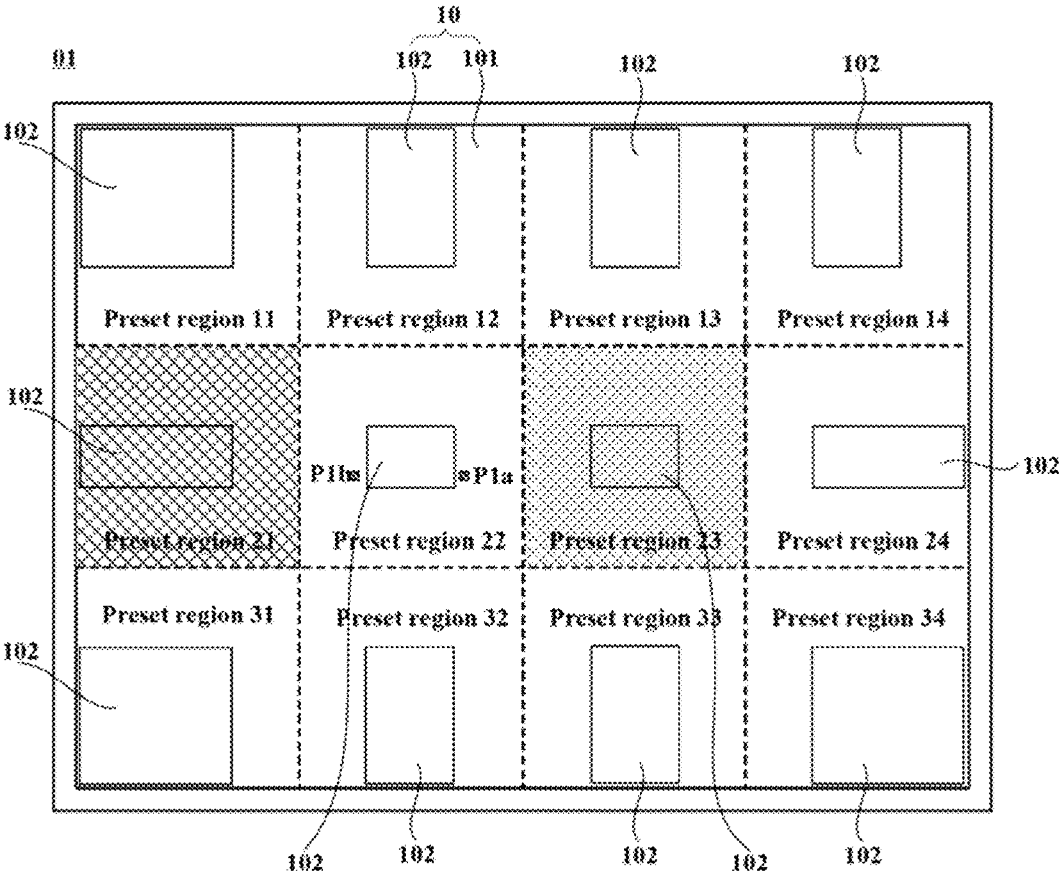
FIG. 14 is a schematic diagram of a first pixel and a corresponding associated preset region in a display panel provided by an embodiment of the present disclosure.
Figure 15:
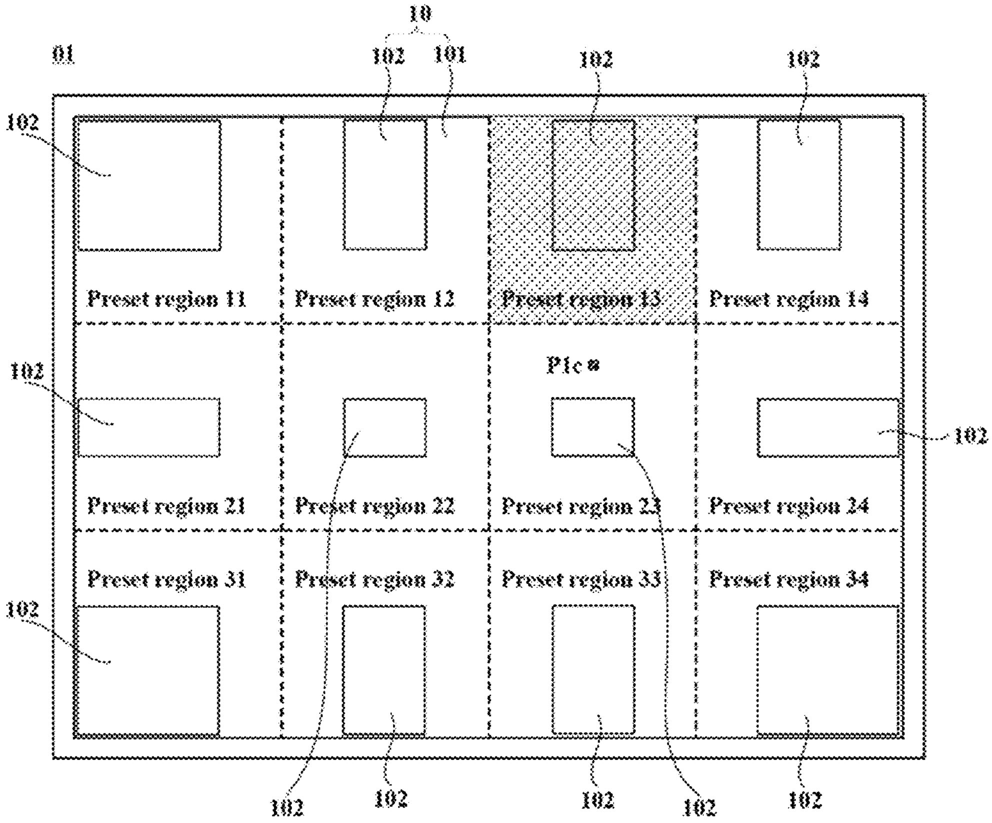
FIG. 15 is a schematic diagram of a first pixel and a corresponding associated preset region in a display panel provided by an embodiment of the present disclosure.

FIG. 13 is a schematic diagram of a first pixel and a corresponding associated preset region in a display panel provided by an embodiment of the present disclosure. FIG. 14 is a schematic diagram of a first pixel and a corresponding associated preset region in a display panel provided by an embodiment of the present disclosure. FIG. 15 is a schematic diagram of a first pixel and a corresponding associated preset region in a display panel provided by an embodiment of the present disclosure. For clarity, FIGS. 13 and 15 respectively illustrate an associated preset region corresponding to a first pixel P1, where the associated preset region corresponding to the first pixel P1 is filled with a pattern.

As shown in FIG. 13, the associated preset region (preset region 10 filled with a dotted pattern) corresponding to the first pixel P1*a* may be the preset region 23. As shown in FIG. 14, the first pixel P1*a* and the first pixel P1*b* are located in the same preset region 10. The associated preset region (preset region 10 filled with a dotted pattern) corresponding to the first pixel P1*a* may be the preset region 23, and the associated preset region (preset region 10 filled with a grid pattern) corresponding to the first pixel P1*b* may be the preset region 21. As shown in FIG. 15, the associated preset region (preset region 10 filled with a dotted pattern) corresponding to the first pixel P1*c*, located in a different preset region 10 from the first pixel P1*a* in FIG. 13 and the first pixel P1*a* and P1*b* in FIG. 14, may be the preset region 13.

In the following figures, the preset region 10 filled with a pattern represents the associated preset region.

In one embodiment of the present disclosure, as shown in FIGS. 13 to 15, the voltage of the first pixel P1 is related to the Gamma curve corresponding to the associated preset region. The associated preset region is adjacent to the preset region 10 where the first pixel P1 is located, and there are no second pixels P2 between the first pixel P1 and the associated preset region. That is, there are no second pixels P2 between a first pixel P1 and its corresponding associated preset region. For example, as shown in FIG. 13, the first pixel P1*a* is located on the right side of the second region 102 in preset region 22, so the left side of preset region 22 does not include the associated preset region corresponding to the first pixel P1*a* to avoid having second pixels P2 between the first pixel P1*a* and its associated preset region. For example, as shown in FIG. 14, the first pixel P1*b* is located on the left side of the second region 102 in preset region 22, so the right side of preset region 22 does not include the associated preset region corresponding to the first pixel P1*b* to avoid having second pixels P2 between the first pixel P1*b* and its associated preset region. For example, as shown in FIG. 15, the first pixel P1*c* is located on the upper side of the second region 102 in preset region 23, so the lower side of preset region 23 does not include the associated preset region corresponding to the first pixel P1*c* to avoid having second pixels P2 between the first pixel P1*c* and its associated preset region.

In one embodiment of the present disclosure, the voltage of the first pixel P1 is related to the Gamma curves corresponding to m3 associated preset regions, and the preset region where the first pixel P1 is located is adjacent to n3 preset regions, where m3≤n3, and m3 is an integer greater than or equal to 1. That is, the number of associated preset regions corresponding to the first pixel P1 is less than or equal to the number of other preset regions adjacent to the preset region 10 where the first pixel P1 is located. As shown in FIG. 13 to FIG. 15, m3=1; n3=3, 5, 8. For example, as shown in FIG. 14, the first pixel P1*a* and the second pixel P1*b* are both located in preset region 22. The preset region 22 is adjacent to a total of 8 other preset regions, but the number of associated preset regions corresponding to the first pixel P1*a* may be 1, and the number of associated preset regions corresponding to the second pixel P1*b* may be 1.

In one technical solution corresponding to this embodiment, the associated preset region corresponding to the first pixel P1 may be selected based on the distance between the preset region where the first pixel P1 is located and the surrounding preset regions 10. The distances between the center point of the preset region where the first pixel P1 is located and the center points of the n3 adjacent preset regions are respectively the first adjacent distance J1 to the n3-th adjacent distance Jn3. The preset regions 10 corresponding to the smaller m3 adjacent distances from J1 to Jn3 are all selected as the associated preset regions, where m3<n3. Then, the distances between the center point of the preset region 10 where the first pixel P1 is located and the center points of the m3 associated preset regions are the associated distances. The associated distances belong to the first adjacent distance J1 to the n3-th adjacent distance Jn3, and the m3 associated distances are all smaller than the other (n3−m3) adjacent distances from the first adjacent distance J1 to the n3-th adjacent distance Jn3.

Figure 16:
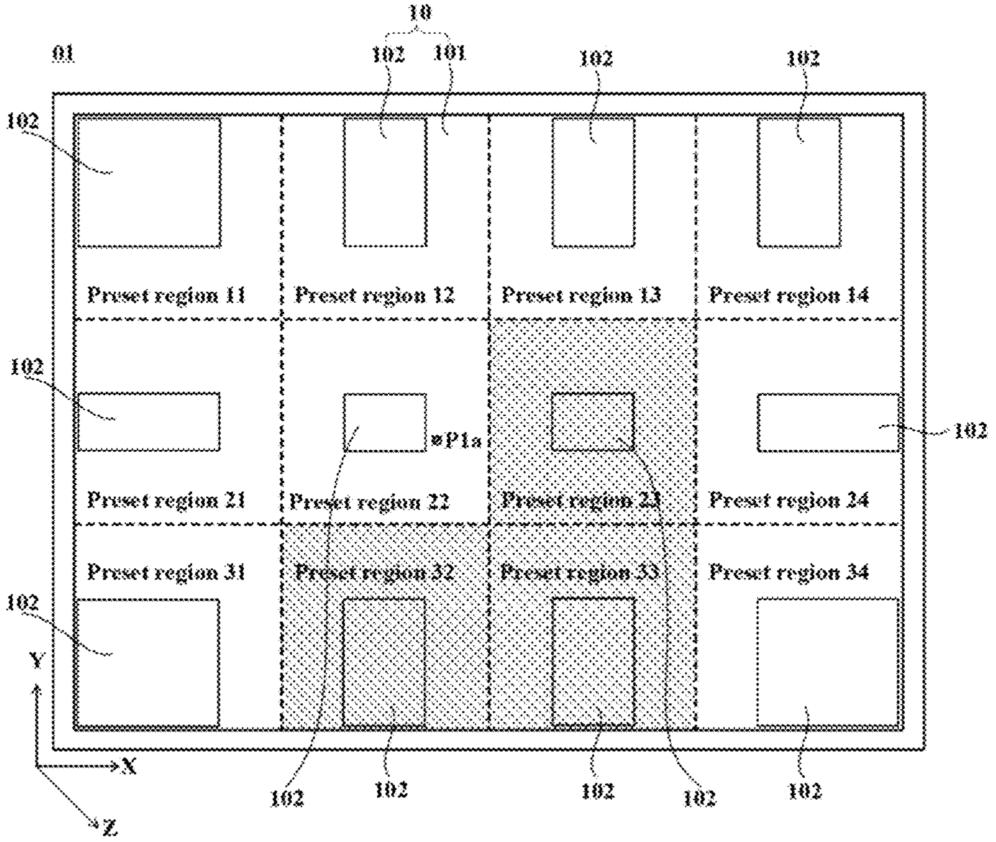
FIG. 16 is a schematic diagram of a first pixel and a corresponding associated preset region in a display panel provided by an embodiment of the present disclosure.

FIG. 16 is a schematic diagram of a first pixel and a corresponding associated preset region in a display panel provided by an embodiment of the present disclosure.

Taking the associated preset region corresponding to the first pixel P1*a* in FIG. 16 as an example, the first pixel P1*a* is located in preset region 22, and preset region 22 is associated with 8 preset regions 10. The adjacent distances between the center point of preset region 22 and the center points of preset region 23, preset region 32, and preset region 33 are smaller than the distances between the center point of preset region 22 and the center points of preset region 11, preset region 12, preset region 13, preset region 21, and preset region 31. Preset region 23, preset region 32, and preset region 33 can be selected as the associated preset regions for the first pixel P1*a*.

Additionally, the characteristic of the associated preset region corresponding to the first pixel P1 may also include that there are no second pixels P2 between the first pixel P1 and its associated preset region. For example, as shown in FIG. 16, the associated preset regions corresponding to the first pixel P1*a* are preset region 23, preset region 32, and preset region 33, and there are no second pixels P2 between preset region 23, preset region 32, preset region 33, and the first pixel P1*a*.

In one technical solution corresponding to this embodiment, the selection of the associated preset region corresponding to the first pixel P1 may involve selecting the preset regions 10 adjacent to the preset region 10 where the first pixel P1 is located that do not include second pixels P2 between them and the first pixel P1. Then, from the selected preset regions 10, the preset regions 10 with the center points closer to the center point of the preset region 10 where the first pixel P1 is located are further selected as the associated preset regions.

In one technical solution corresponding to this embodiment, the plurality of preset regions 10 adjacent to the preset region 10 where the first pixel P1 is located include: the preset regions 10 arranged in the first direction X, which are adjacent to the preset region 10 where the first pixel P1 is located; the preset regions 10 arranged in the second direction Y, which are adjacent to the preset region 10 where the first pixel P1 is located; and the preset regions 10 arranged in the third direction Z, which are adjacent to the preset region 10 where the first pixel P1 is located. The associated preset region corresponding to the first pixel P1 includes: the closest preset region 10 to the first pixel P1 in the first direction X, the closest preset region 10 to the first pixel P1 in the second direction Y, and the closest preset region 10 to the first pixel P1 in the third direction Z. For example, as shown in FIG. 16, the first pixel P1*a* is located in preset region 22. Among the preset regions 21 and 23, which are arranged adjacent to preset region 22 in the first direction X, preset region 23 is closer to the first pixel P1*a*, so preset region 23 may be the associated preset region for the first pixel P1*a*. Among the preset regions 12 and 32, which are arranged adjacent to preset region 22 in the second direction Y, preset region 32 is closer to the first pixel P1*a*, so preset region 32 may also be the associated preset region for the first pixel P1*a*. Among the preset regions 11 and 33, which are arranged adjacent to preset region 22 in the third direction Z, preset region 33 is closer to the first pixel P1*a*, so preset region 33 may also be the associated preset region for the first pixel P1*a*.

In one implementation, when the preset region 10 where the first pixel P1 is located is far from the edge of the display panel 01, the m3 and n3 corresponding to the first pixel P1 satisfy: m3<n3. That is, when the preset region 10 where the first pixel P1 is located is a non-edge preset region, the associated preset region corresponding to the first pixel P1 only includes some of the preset regions 10 adjacent to the preset region 10 where the first pixel P1 is located.

Figure 17:
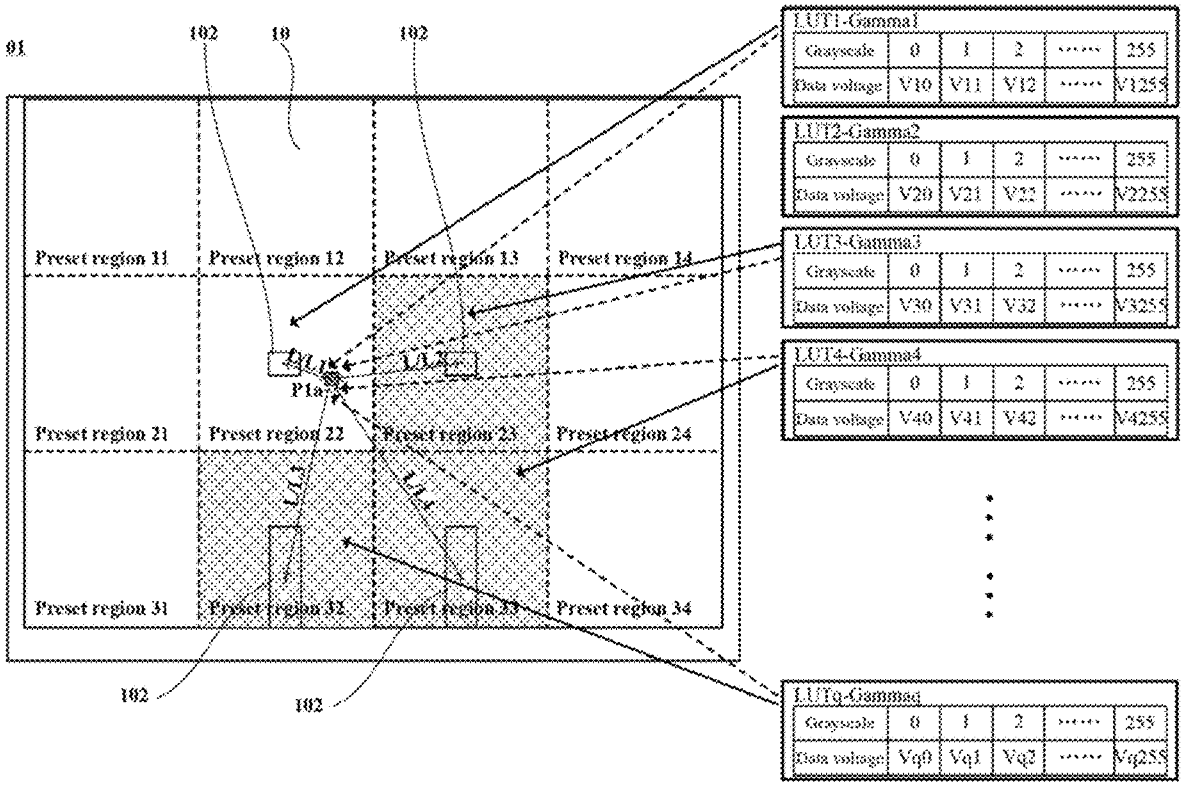
FIG. 17 is a schematic diagram of a corresponding relationship between a display panel and Gamma curves provided by an embodiment of the present disclosure.

FIG. 17 is a schematic diagram of a corresponding relationship between a display panel and Gamma curves provided by an embodiment of the present disclosure.

Optionally, the distance from the first pixel P1/P1*a* to each preset region 10 may be the first distance L, and the size of the first distance L corresponding to different preset regions 10 is different. Among them, Gamma curves corresponding to a preset region with the smallest Q first distances L (also including the preset region 10 where the first pixel P1*a* is located) are associated with the first pixel P1*a*.

Optionally, the first distance L is the distance from the first pixel P1*a* to the center point of each preset region 10.

Optionally, the preset region is adjacent to or borders the edges of other preset regions in Q directions.

With such a design, considering that the preset region is actually adjacent to the edges of other preset regions in four directions, the selection of the associated preset region for the first pixel P1 may be more precise, further improving the effect.

Optionally, the display panel has straight edges in Q directions. Alternatively, a sub-screen in the middle region of a spliced screen is spliced with the edges of other sub-screens in Q directions.

Optionally, Q=4. That is, the distance from the first pixel P1*a* to each preset region 10 may be the first distance L, and the size of the first distance L corresponding to different preset regions 10 is different. Among them, the Gamma curves corresponding to the preset regions with the smallest four first distances L (also including the preset region where the first pixel P1*a* is located) are associated with the first pixel P1*a*.

With such a design, the division of the preset regions 10 is more aligned with the edge shape of the display panel, further improving the effect.

In one embodiment of the present disclosure, as shown in FIG. 17, the data voltage received by the first pixel P1 is also related to the distance L between the second region 102 in each reference preset region associated with the first pixel P1 and the first pixel P1. The reference preset regions associated with the first pixel P1 include the associated preset region corresponding to the first pixel P1 and the preset region where the first pixel P1 is located. When the data voltage received by the first pixel P1 is related to the Gamma curves corresponding to a plurality of preset regions 10, the distance between the first pixel P1 and the standard emission regions in the plurality of preset regions 10 affects the final emission brightness of the first pixel P1. It can be understood that among the plurality of preset regions 10, the preset data voltage obtained according to the Gamma curve of the preset region 10, where the second region 102 is closer to the first pixel P1, should have a greater correlation with the data voltage received by the first pixel P1. The preset data voltage obtained according to the Gamma curve of the preset region 10, where the second region 102 is farther from the first pixel P1, should have a smaller correlation with the data voltage received by the first pixel P1.

For example, as shown in FIG. 17, the first pixel P1*a* is located in preset region 22, and the reference preset regions corresponding to the first pixel P1*a* include preset region 22, preset region 23, preset region 32, and preset region 33. When the display panel 01 is in a first state, the data voltage received by the first pixel P1*a* is related to Gamma1 curve corresponding to preset region 22, Gamma3 curve corresponding to preset region 23, Gammaq curve corresponding to preset region 32, and Gamma4 curve corresponding to preset region 33. Suppose the first pixel P1*a* displays a grayscale of 2, then the data voltage received by the first pixel P1*a* is related to the preset data voltage V12 obtained by looking up LUT1, the preset data voltage V32 obtained by looking up LUT3, the preset data voltage V42 obtained by looking up LUT4, and the preset data voltage Vq2 obtained by looking up LUTq. However, the degree of correlation between the data voltage received by the first pixel P1*a* and the preset data voltage obtained by looking up LUT1, LUT3, LUT4, and LUTq differs. For example, the distance between the second region 102 in preset region 22 and the first pixel P1*a* is L1, the distance between the second region 102 in preset region 23 and the first pixel P1*a* is L2, the distance between the second region 102 in preset region 32 and the first pixel P1*a* is L3, and the distance between the second region 102 in preset region 33 and the first pixel P1*a* is L4. If L1<L2<L3<L4, then the degree of correlation between the data voltage received by the first pixel P1*a* and the preset data voltage V12, the preset data voltage V32, the preset data voltage V42, and the preset data voltage Vq2 gradually decreases.

It can be understood that when integrating the preset data voltage V12, preset data voltage V32, preset data voltage V42, and preset data voltage Vq2 into the data voltage received by the first pixel P1*a*, the weights corresponding to the preset data voltage V12, the preset data voltage V32, the preset data voltage V42, and the preset data voltage Vq2 are negatively correlated with the distance between the first pixel P1*a* and the second region 102 in their respective reference preset regions.

Figure 18:
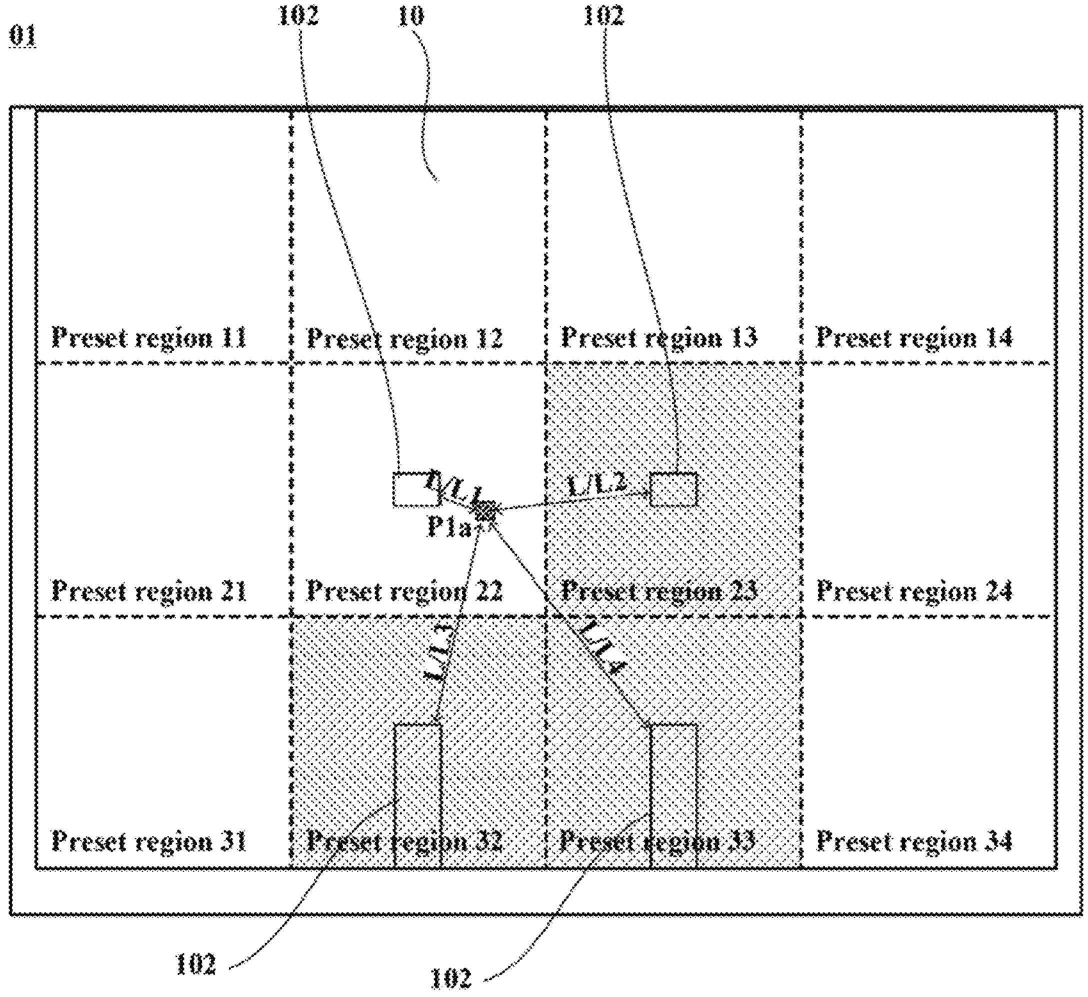
FIG. 18 is a schematic diagram of a display panel provided by an embodiment of the present disclosure.

FIG. 18 is a schematic diagram of a display panel provided by an embodiment of the present disclosure.

In one technical solution corresponding to this embodiment, as shown in FIG. 18, the distance L between the first pixel P1 and the second region 102 in each reference preset region associated with the first pixel P1 is the minimum distance between the first pixel P1 and the edge of the second region 102 in the reference preset region associated with the first pixel P1. Therefore, the data voltage received by the first pixel P1 is related to the minimum distance between the edge of the second region 102 in each reference preset region associated with the first pixel P1 and the first pixel P1.

In one technical solution corresponding to this embodiment, as shown in FIG. 17, the distance between the first pixel P1 and the second region 102 in each reference preset region associated with the first pixel P1 is the minimum distance between the first pixel P1 and the center of the second region 102 in the reference preset region associated with the first pixel P1. Therefore, the data voltage received by the first pixel P1 is related to the minimum distance between the first pixel P1 and the center point of the second region 102 in each reference preset region associated with the first pixel P1.

In one technical solution of the present disclosure, when the display panel 01 is in the first state, the data voltage V2 received by the first pixel P1, and the Gamma curve of the reference preset region, and the distance between the first pixel P1 and the second region 102 in the reference preset region, may satisfy:

$$V2 = \frac{\sum_{i=1}^{S} V_i \prod_{j\neq i} L_j}{\sum_{i=1}^{S} \prod_{j\neq i} L_j}$$

where S is the number of reference preset regions associated with the first pixel P1, S≥i, j≥1, $V_i$ is the preset data voltage obtained based on the grayscale value of the first pixel P1 and the Gamma curve corresponding to the i-th reference preset region, and $L_j$ is the distance between the first pixel P1 and the second region 102 in the j-th reference preset region.

In one technical solution of the present disclosure, when the display panel 01 is in the first state, the data voltage V2 received by the first pixel P1, and the Gamma curve of the reference preset region, and the distance between the first pixel P1 and the second region 102 in the reference preset region, may also satisfy:

$$V2 = \frac{\sum_{i=1}^{S} V_i e^{-aL_i}}{\sum_{i=1}^{S} e^{-aL_i}}$$

where S is the number of reference preset regions associated with the first pixel P1, S≥i≥1, a is the first empirical value, $V_i$ is the data voltage obtained based on the grayscale value of the first pixel P1 and the Gamma curve corresponding to the i-th reference preset region, and $L_i$ is the distance between the first pixel P1 and the second region 102 in the i-th reference preset region.

In one technical solution of the present disclosure, when the display panel 01 is in the first state, the data voltage V2 received by the first pixel P1, and the Gamma curve of the reference preset region, and the distance between the first pixel P1 and the second region 102 in the reference preset region may also satisfy:

$$V2 = \begin{cases} \dfrac{\sum_{i=1}^{S} V_i e^{-a(L_i-b)}}{\sum_{i=1}^{S} e^{-aL_i}} & L > b \\ \dfrac{\sum_{i=1}^{S} V_i}{S} & L < b \end{cases}$$

where S is the number of reference preset regions associated with the first pixel P1, S≥i≥1, a is the first empirical value, b is the second empirical value, $V_i$ is the data voltage obtained based on the grayscale value of the first pixel P1 and the Gamma curve corresponding to the i-th reference preset region, and $L_j$ is the distance between the first pixel P1 and the second region 102 in the i-th reference preset region.

The embodiment of the present disclosure may more precisely select the reference preset regions associated with the first pixel P1. Since the data voltage received by the first pixel P1 is related to the distance between the first pixel P1 and the reference preset regions, the brightness of the first pixel P1 and the brightness of the corresponding reference preset regions have a clearer influence on the brightness of the first pixel P1. The brightness changes near the boundary of multiple adjacent preset regions become more refined, further enhancing the visual effect of the display panel 01.

Figure 19:
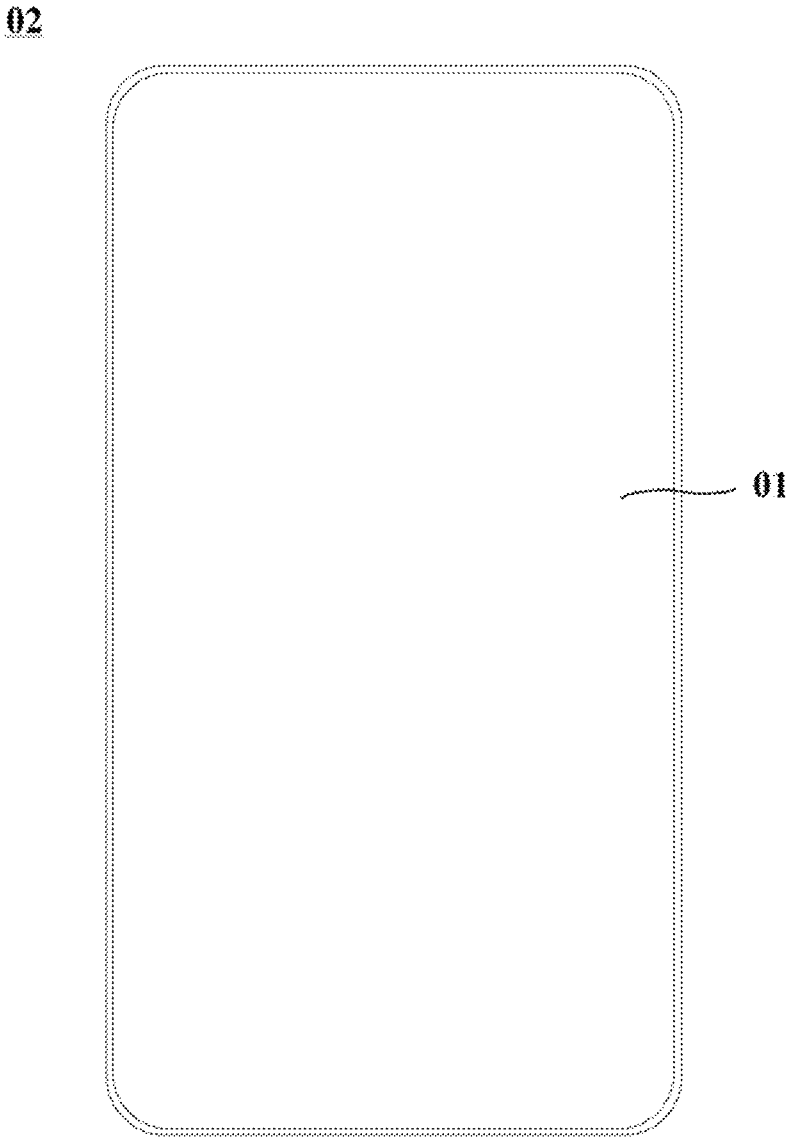
FIG. 19 is a schematic diagram of a display device provided by an embodiment of the present disclosure.

FIG. 19 is a schematic diagram of a display device provided by an embodiment of the present disclosure.

An embodiment of the present disclosure provides a display device 02. As shown in FIG. 19, the display device 02 includes the display panel 01 provided in the above embodiments. The display device 02 provided by the present disclosure may be an electronic device such as a mobile phone, a computer, a television, a vehicle display device, an advertising screen, a publicity screen, or a spliced screen, etc. The present disclosure is not specifically limited to any particular device.

In the display device 02 provided by the present disclosure, the display brightness of different preset regions is relatively uniform, and the brightness near the boundary of adjacent preset regions is also uniform.

Figure 20:
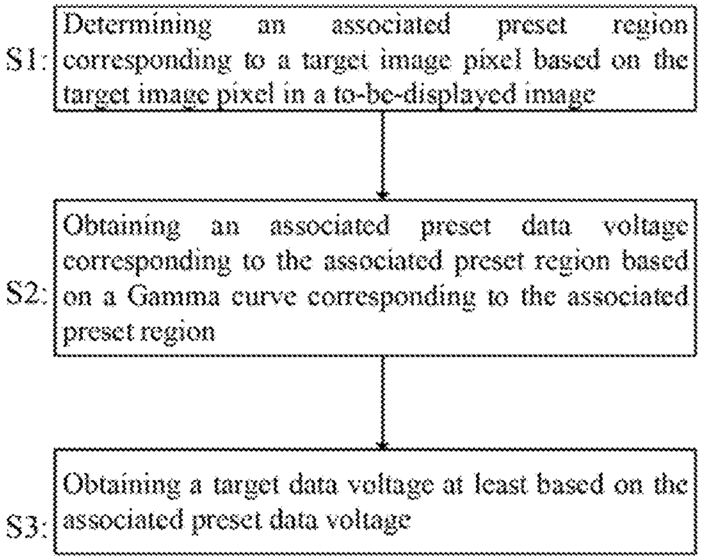
FIG. 20 is a schematic diagram of a flow chart of a brightness compensation method for a display panel provided by an embodiment of the present disclosure.

FIG. 20 is a flow chart of a brightness compensation method for a display panel provided by an embodiment of the present disclosure.

An embodiment of the present disclosure provides a brightness compensation method for a display panel. This compensation method may compensate the brightness of the display panel provided in any of the above embodiments. The display panel 01 may include a plurality of preset regions 10, the division of which has been described in the above embodiments and will not be repeated here. As shown in FIG. 20, the compensation method provided by the present disclosure is applicable when the display panel 01 is in a first state, and may include:

S1: Determining an associated preset region corresponding to a target image pixel based on the target image pixel in a to-be-displayed image.

The associated preset region is adjacent to a preset region where a first pixel is located in the display panel, and the first pixel is required to display the target image pixel. After receiving image information of the to-be-displayed image, TCON scales, enhances, and processes the image information. The processed image information includes information related to a plurality of image pixels in the to-be-displayed image, such as a position and grayscale of the image pixel.

The target image pixel is one of the plurality of image pixels in the image information. The information related to the target image pixel will be presented by pixels included in the display panel 01. The information related to the target image pixel determines the position and the grayscale to be displayed by panel pixels (hereinafter referred to as pixels) used to present the image pixel in the display panel.

Where, the pixel, which is used to present the target image pixel, in the display panel is the first pixel, and the associated preset region corresponding to the target image pixel is the associated preset region corresponding to the first pixel P1 used to present the target image pixel. That is, the associated preset region is adjacent to the preset region where the first pixel required to display the target image pixel is located in the display panel. The associated preset region corresponding to the first pixel P1 has been described in detail in the above embodiments and will not be repeated here.

S2: Obtaining an associated preset data voltage corresponding to the associated preset region based on a Gamma curve corresponding to the associated preset region.

The Gamma curve corresponding to the associated preset region is stored in a register of TCON in a form of LUT. The Gamma curve corresponding to the associated preset region is a LUT corresponding to the associated preset region when the display panel 01 is in the first state. This has been described in detail in the above embodiments and will not be repeated here.

Based on the Gamma curve corresponding to the associated preset region, obtain the associated preset data voltage, which may be achieved by looking up a preset data voltage corresponding to the grayscale of the target image pixel in the LUT corresponding to the associated preset region, and using a found preset data voltage as the associated preset data voltage.

S3: Obtaining a target data voltage at least based on the associated preset data voltage. The target data voltage is a data voltage transmitted to the first pixel P1 corresponding to the target image pixel when a to-be-displayed image is displayed. That is, the target data voltage is the data voltage received by the first pixel P1 when the display panel 01 displays the to-be-displayed image. The first pixel P1 corresponding to the target image pixel is a pixel used to present the target image pixel in the display panel.

The brightness compensation method provided by the embodiment of the present disclosure may make the data voltage received by the first pixel P1 related to a Gamma curve corresponding to at least one preset region 10 adjacent to a preset region 10 where the first pixel P1 is located. Therefore, the problem of brightness discontinuity between the preset region 10 where the first pixel P1 is located and the adjacent preset region 10 may be alleviated, resulting in better brightness uniformity when the display panel 01 is in the first state.

Figure 21:
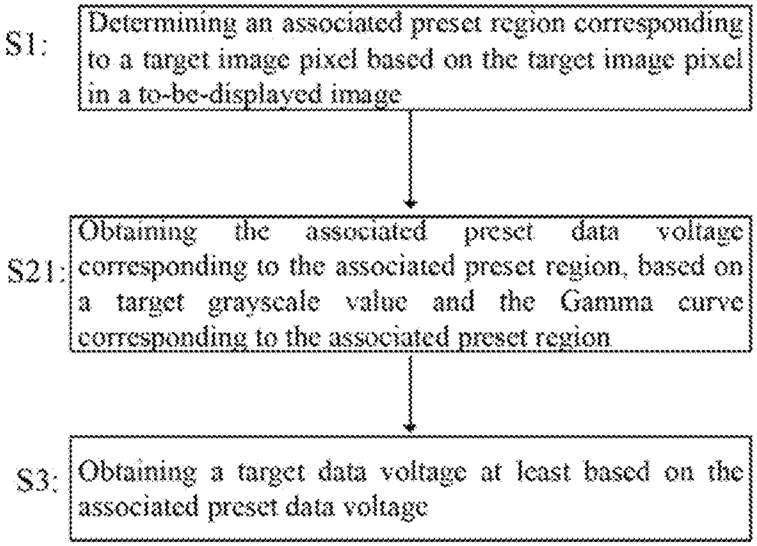
FIG. 21 is a schematic diagram of a flow chart of a brightness compensation method for a display panel provided by an embodiment of the present disclosure.

FIG. 21 is a flow chart of a brightness compensation method for a display panel provided by an embodiment of the present disclosure.

In one embodiment of the present disclosure, as shown in FIG. 21, based on the Gamma curve corresponding to the associated preset region, obtaining the associated preset data voltage corresponding to the associated preset region includes:

S21: Obtaining the associated preset data voltage corresponding to the associated preset region, based on a target grayscale value and the Gamma curve corresponding to the associated preset region. The target grayscale value is a grayscale value of the target image pixel.

Figure 22:
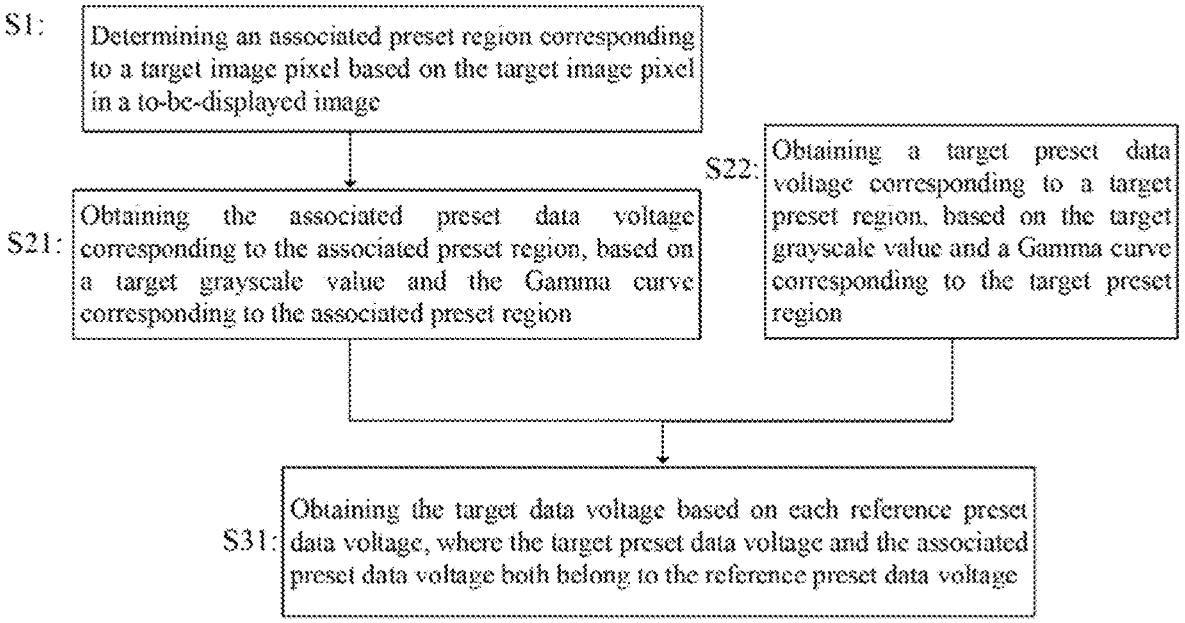
FIG. 22 is a schematic diagram of a flow chart of a brightness compensation method for a display panel provided by an embodiment of the present disclosure.

FIG. 22 is a flow chart of a brightness compensation method for a display panel provided by an embodiment of the present disclosure.

In one embodiment of the present disclosure, as shown in FIG. 22, the brightness compensation method provided by the present disclosure further includes:

S22: Obtaining a target preset data voltage corresponding to a target preset region, based on the target grayscale value and a Gamma curve corresponding to the target preset region. The target preset region is the preset region 10 where the first pixel P1 required to display the target image pixel is located, that is, the preset region 10 where the first pixel P1 used to present the target image pixel in the display panel is located.

The Gamma curve corresponding to the target preset region is also stored in the register of TCON in the form of LUT. The Gamma curve corresponding to the target preset region is the LUT corresponding to the target preset region when the display panel 01 is in the first state.

Based on the target grayscale value and the Gamma curve corresponding to the target preset region, obtain the target preset data voltage corresponding to the target preset region, which may be achieved by looking up the preset data voltage corresponding to the grayscale of the target image pixel in the LUT corresponding to the target preset region, and using the found preset data voltage as the target preset data voltage.

Furthermore, obtaining the target data voltage at least based on the associated preset data voltage includes:

S31: Obtaining the target data voltage based on each reference preset data voltage. The target preset data voltage and the associated preset data voltage both belong to the reference preset data voltage. That is, the target data voltage is obtained based on the associated preset data voltage and the target preset data voltage.

In one embodiment of the present disclosure, the brightness compensation method provided by the present disclosure may further include:

Obtaining a Gamma curve corresponding to each reference preset region based on a temperature of each reference preset region. The reference preset region includes the target preset region and the associated preset region. The Gamma curve corresponding to each associated preset region is determined based on a temperature corresponding to each associated preset region, which means determining the LUT corresponding to the associated preset region; and the Gamma curve corresponding to the target preset region is determined based on a temperature corresponding to the target preset region, which means determining the LUT corresponding to the target preset region.

The plurality of preset regions 10 included in the display panel 01 may be divided based on a temperature distribution pattern of the display panel 01, so a Gamma curve corresponding to each preset region 10 is related to its temperature. This embodiment of the present disclosure may solve the display unevenness problem caused by the temperature difference between at least two adjacent preset regions 10 and the display unevenness problem near the junction of preset regions 10 with different temperatures.

Figure 23:
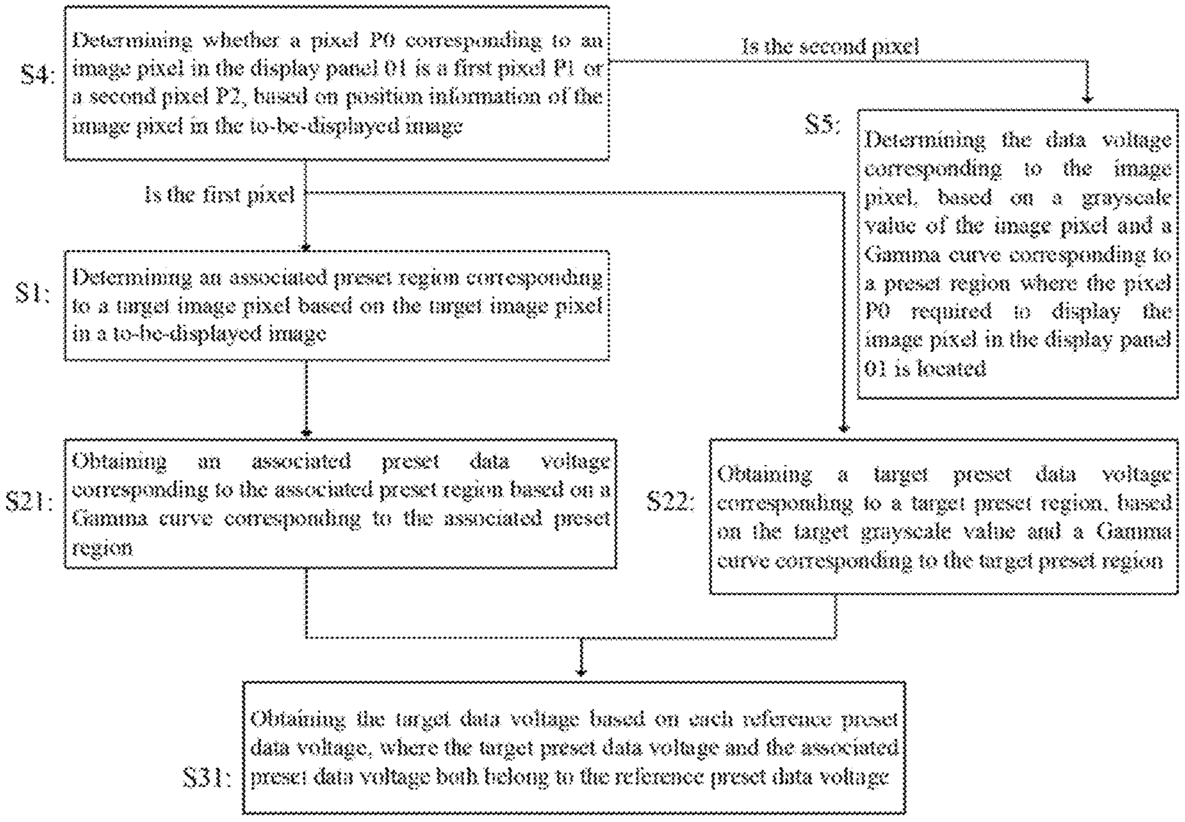
FIG. 23 is a schematic diagram of a flow chart of a brightness compensation method for a display panel provided by an embodiment of the present disclosure.

FIG. 23 is a flow chart of a brightness compensation method for a display panel provided by an embodiment of the present disclosure.

In one embodiment of the present disclosure, as shown in FIG. 23, the brightness compensation method provided by the present disclosure further includes:

S4: Determining whether a pixel P0 corresponding to an image pixel in the display panel 01 is a first pixel P1 or a second pixel P2, based on position information of the image pixel in the to-be-displayed image. A first region 101 and a second region 102 are included in the preset region, and the first region 101 is located on a side of the second region 102 closer to an adjacent preset region. The first pixel P1 is located in the first region 101, and the second pixel P2 is located in the second region 102.

When the pixel P0 corresponding to the image pixel in the display panel 01 is the first pixel P1, the image pixel is the target image pixel, and steps S1, S2, and S3 are performed.

When the pixel P0 corresponding to the image pixel in the display panel 01 is the second pixel P2, the image pixel is not the target image pixel, and then step S5 is performed.

S5: Determining the data voltage corresponding to the image pixel, based on a grayscale value of the image pixel and a Gamma curve corresponding to a preset region where the pixel P0 required to display the image pixel in the display panel 01 is located.

When the image pixel is not the target image pixel, the image pixel is displayed using the second pixel P2 in the display panel. At this time, the second pixel P2 needs a data voltage. The LUT corresponding to the preset region 10 where the second pixel P2 is located can be looked up to obtain the preset data voltage corresponding to the grayscale of the image pixel, and the preset data voltage is used as the data voltage corresponding to the image pixel.

In the brightness compensation method provided by the present disclosure, obtaining the target data voltage based on the reference preset data voltage may include:

Based on each reference preset data voltage and a distance between the first pixel P1 and the second region 102 of each reference preset region, obtaining the target data voltage using formula (1). The target preset region and the associated preset region both belong to the reference preset region.

$$V2 = \frac{\sum_{i=1}^{S} V_i \prod_{j\neq i} L_j}{\sum_{i=1}^{S} \prod_{j\neq i} L_j} \tag{1}$$

Where, S is the number of reference preset region associated with the first pixel P1, S≥i, j≥1, $V_i$ is the reference preset data voltage obtained based on the target grayscale value and the Gamma curve corresponding to the i-th reference preset region, and $L_j$ is the distance between the first pixel P1 and the second region 102 in the j-th reference preset region.

In the brightness compensation method provided by the present disclosure, obtaining the target data voltage based on the reference preset data voltage may also include:

Based on each reference preset data voltage and the distance between the first pixel P1 and the second region 102 of each reference preset region, obtaining the target data voltage using formula (2). The target preset region and the associated preset region both belong to the reference preset region.

$$V2 = \frac{\sum_{i=1}^{S} V_i e^{-aL_i}}{\sum_{i=1}^{S} e^{-aL_i}} \tag{2}$$

Where, S is the number of reference preset regions associated with the first pixel P1, S≥i≥1, a is the first empirical value, $V_i$ is the reference preset data voltage obtained based on the target grayscale value and the Gamma curve corresponding to the i-th reference preset region, and $L_i$ is the distance between the first pixel P1 and the second region 102 in the i-th reference preset region.

Based on each reference preset data voltage and the distance between the first pixel P1 and the second region 102 of each reference preset region, the target data voltage is obtained by formula (3). The target preset region and the associated preset region both belong to the reference preset region.

$$V2 = \begin{cases} \dfrac{\sum_{i=1}^{S} V_i e^{-a(L_i-b)}}{\sum_{i=1}^{S} e^{-aL_i}}, & L > b \\ \dfrac{\sum_{i=1}^{S} V_i}{S}, & L < b \end{cases} \tag{3}$$

Where, S is the number of reference preset regions associated with the first pixel P1, S≥i≥1, a is the first empirical value, b is the second empirical value, $V_i$ is the reference preset data voltage obtained based on the target grayscale value and the Gamma curve corresponding to the i-th reference preset region, and $L_i$ is the distance between the first pixel P1 and the second area 102 in the i-th reference preset region.

The present disclosure further provides a chip for executing the brightness compensation method provided in any of the above embodiments. The chip may be used to drive a display panel for light emission display.

The above descriptions are merely preferred embodiments of the present disclosure and are not intended to limit the present disclosure. Any modifications, equivalent replacements, improvements, etc., made within the spirit and principles of the present disclosure should be included in the scope of protection of the present disclosure.

What is claimed is:

1. A display panel, comprising a plurality of preset regions, wherein a preset region of the plurality of preset regions comprises at least one first pixel; and when the display panel is in a first state, a data voltage received by the first pixel is related to a Gamma curve corresponding to at least one preset region adjacent to a preset region where the first pixel is located, and a data voltage received by at least one pixel, other than the first pixel, in the preset region is unrelated to Gamma curves corresponding to preset regions adjacent to the preset region where the first pixel and the at least one pixel is located.

2. The display panel according to claim 1, wherein the data voltage received by the first pixel is also related to:

a Gamma curve corresponding to the preset region where the first pixel is located; and a grayscale value that is required to be displayed by the first pixel.

3. The display panel according to claim 1, wherein when the display panel is in the first state, at least two adjacent preset regions respectively correspond to different Gamma curves.

4. The display panel according to claim 1, wherein when the display panel is in the first state, temperatures of at least two adjacent preset regions are different.

5. The display panel according to claim 1, wherein the preset region of the plurality of preset regions comprises a first region and a second region, wherein the first region is located on a side of the second region close to an adjacent preset region, and the first pixel is located in the first region; and the second region comprises at least one second pixel, and a data voltage received by the second pixel is related to:

a grayscale value that is required to be displayed by the second pixel; and a Gamma curve corresponding to a preset region where the second pixel is located.

6. The display panel according to claim 5, wherein at least a portion of the second region in the plurality of preset regions comprises one second pixel.

7. The display panel according to claim 5, wherein the second region comprises at least n1 of the second pixel arranged in a first direction, and at least m1 of the second pixel arranged in a second direction, wherein n1 is an integer greater than or equal to 2, and m1 is an integer greater than or equal to 2.

8. The display panel according to claim 7, wherein a sum of a number of the first pixel and a number of the second pixel in the preset region of the plurality of preset regions along the first direction is n2; and a sum of a number of the first pixel and a number of the second pixel in the preset region the preset region of the plurality of preset regions along the second direction is m2, wherein n1/n2≥⅕ and/or m1/m2≥⅕.

9. The display panel according to claim 5, wherein the data voltage received by the first pixel is related to a Gamma curve corresponding to an associated preset region, wherein the associated preset region is adjacent to the preset region where the first pixel is located; and the second pixel is not located between the associated preset region and the first pixel.

10. The display panel according to claim 5, wherein the data voltage received by the first pixel is related to a Gamma curve corresponding to an associated preset region, wherein the associated preset region is adjacent to the preset region where the first pixel is located; and the data voltage received by the first pixel is also related to a distance between the first pixel and a second region in a reference preset region associated with the first pixel, wherein the reference preset region associated with the first pixel comprises the associated preset region corresponding to the first pixel and the preset region where the first pixel is located.

11. The display panel according to claim 10, wherein the distance between the first pixel and the second region in the reference preset region associated with the first pixel is a minimum distance between the first pixel and an edge of the second region in the reference preset region associated with the first pixel.

12. The display panel according to claim 10, wherein the distance between the first pixel and the second region in the reference preset region associated with the first pixel is a minimum distance between the first pixel and a center point of the second region in the reference preset region associated with the first pixel.

13. The display panel according to claim 10, wherein the data voltage V2 received by the first pixel satisfies:

$$V2 = \frac{\sum_{i=1}^{S} V_i \prod_{j \neq i} L_j}{\sum_{i=1}^{S} \prod_{j \neq i} L_j}$$

where S is a number of the reference preset region associated with the first pixel, S≥i, j≥1, $V_i$ is a data voltage obtained based on a grayscale value of the first pixel and a Gamma curve corresponding to an i-th reference preset region, and $L_j$ is a distance between the first pixel and a second region in a j-th reference preset region.

14. The display panel according to claim 10, wherein the data voltage V2 received by the first pixel satisfies:

$$V2 = \frac{\sum_{i=1}^{S} V_i e^{-aL_i}}{\sum_{i=1}^{S} e^{-aL_i}}$$

where S is a number of the reference preset region associated with the first pixel, S≥i≥1, a is a first empirical value, $V_i$ is a data voltage obtained based on a grayscale value of the first pixel and a Gamma curve corresponding to an i-th reference preset region, and $L_i$ is a distance between the first pixel and the second region in the i-th reference preset region.

15. The display panel according to claim 10, wherein the data voltage V2 received by the first pixel satisfies:

$$V2=\begin{cases}\dfrac{\sum_{i=1}^{S}V_ie^{-a(L_i-b)}}{\sum_{i=1}^{S}e^{-aL_i}} & L>b\\ \dfrac{\sum_{i=1}^{S}V_i}{S} & L<b\end{cases}$$

where S is a number of the reference preset region associated with the first pixel, S≥i≥1, a is a first empirical value, b is a second empirical value, $V_i$ is a data voltage obtained based on a grayscale value of the first pixel and a Gamma curve corresponding to an i-th reference preset region, L is a distance between the first pixel and the second region in each reference preset region associated with the first pixel, and $L_i$ is a distance between the first pixel and a second region in the i-th reference preset region.

16. The display panel according to claim 1, wherein the data voltage received by the first pixel is related to Gamma curves corresponding to a number m3 of associated preset regions;

the preset region where the first pixel is located is adjacent to a number n3 of preset regions, m3≤n3, and m3 is an integer greater than or equal to 1; and the associated preset regions are adjacent to the preset region where the first pixel is located.

17. The display panel according to claim 16, wherein m3<n3;

distances between a center point of the preset region where the first pixel is located and center points of n3 adjacent preset regions are a first adjacent distance to a n3-th adjacent distance respectively; and distances between the center point of the preset region where the first pixel is located and center points of the m3 associated preset regions are all associated distances, wherein the associated distances belong to the first adjacent distance to the n3-th adjacent distance, and m3 of the associated distances are all smaller than the other (n3–m3) adjacent distances in the first adjacent distance to the n3-th adjacent distance.

18. The display panel according to claim 16, wherein the preset region where the first pixel is located is far from an edge of the display panel, and values of n3 and m3 corresponding to the first pixel satisfy: m3<n3.

19. A display device, comprising the display panel according to claim 1.

20. A display panel, comprising a plurality of preset regions, wherein a preset region of the plurality of preset regions comprises at least one first pixel;

when the display panel is in a first state, a data voltage received by the first pixel is related to a Gamma curve corresponding to at least one preset region adjacent to a preset region where the first pixel is located; and the preset region of the plurality of preset regions comprises a first region and a second region, wherein the first region is located on a side of the second region close to an adjacent preset region, and the first pixel is located in the first region; and the second region comprises at least one second pixel, and a data voltage received by the second pixel is related to:

a grayscale value that is required to be displayed by the second pixel;

a Gamma curve corresponding to a preset region where the second pixel is located;

at least a portion of the second region in the plurality of preset regions comprises one second pixel; and the plurality of preset regions comprise an edge preset region and a non-edge preset region, wherein the edge preset region is adjacent to an edge of the display panel; and the non-edge preset region is located on a side of the edge preset region away from the edge of the display panel, wherein the second region in the non-edge preset region comprises one second pixel;

the second region in the edge preset region is located on a side of the first region adjacent to the edge of the display panel; and the second region in the edge preset region comprises multiple second pixels.

21. A brightness compensation method for a display panel, wherein the display panel comprises a plurality of preset regions; and the method comprises:

determining an associated preset region corresponding to a target image pixel based on the target image pixel in a to-be-displayed image, wherein the associated preset region is adjacent to a preset region where a first pixel is located and the first pixel is required for displaying the target image pixel in the display panel;

obtaining an associated preset data voltage corresponding to the associated preset region based on a Gamma curve corresponding to the associated preset region; and obtaining a target data voltage at least based on the associated preset data voltage, wherein the target data voltage is a data voltage transmitted to the first pixel corresponding to the target image pixel when the to-be-displayed image is displayed, and wherein at least one other pixel in the display panel, located in a same preset region as the first pixel, receives a data voltage that is unrelated to Gamma curves corresponding to preset regions adjacent to the preset region where the first pixel and the at least one other pixel are located.

22. The method according to claim 21, wherein obtaining the associated preset data voltage based on the Gamma curve corresponding to the associated preset region, comprises:

obtaining the associated preset data voltage based on a target grayscale value and the Gamma curve corresponding to the associated preset region, wherein the target grayscale value is a grayscale value of the target image pixel.

23. The method according to claim 22, wherein the method further comprises:

obtaining a target preset data voltage corresponding to a target preset region based on the target grayscale value and a Gamma curve corresponding to the target preset region, wherein the target preset region is a preset region where the first pixel is located, and the first pixel is required for displaying the target image pixel in the display panel; and obtaining the target data voltage at least based on the associated preset data voltage, comprises:

obtaining the target data voltage based on each reference preset data voltage, wherein the reference preset data voltage comprises the target preset data voltage and the associated preset data voltage.

24. The method according to claim 23, further comprising:

obtaining a Gamma curve corresponding to each reference preset region based on a temperature of each reference preset region, wherein the reference preset region comprises the target preset region and the associated preset region.

25. The method according to claim 23, further comprising:

determining whether a pixel corresponding to an image pixel in the display panel is the first pixel or a second pixel, based on position information of the image pixel in the to-be-displayed image, wherein a preset region comprises a first region and a second region, the first region is located on a side of the second region closer to an adjacent preset region, the first pixel is located in a first region, and the second pixel is located in a second region;

determining the associated preset region corresponding to the target image pixel, based on the target image pixel in the to-be-displayed image, wherein when the pixel corresponding to the image pixel in the display panel is the first pixel, the image pixel is the target image pixel; and determining a data voltage corresponding to the image pixel, based on a grayscale value of the image pixel and a Gamma curve corresponding to the preset region where the pixel that is required for displaying the image pixel in the display panel is located, wherein when the pixel corresponding to the image pixel in the display panel is the second pixel, the image pixel is not the target image pixel.

26. The method according to claim 25, wherein the obtaining the target data voltage based on each reference preset data voltage, comprises: obtaining the target data voltage using one of formulas (1)-(3), based on each reference preset data voltage and a distance between the first pixel and the second region in each reference preset region, wherein the reference preset region comprises the target preset region and the associated preset region;

$$V2 = \frac{\sum_{i=1}^{S} V_i \prod_{j\neq i} L_j}{\sum_{i=1}^{S} \prod_{j\neq i} L_j} \tag{1}$$

where S is a number of the reference preset region associated with the first pixel, S≥i, j≥1, Vis the reference preset data voltage obtained based on the target grayscale value and a Gamma curve corresponding to an i-th reference preset region, and $L_j$ is a distance between the first pixel and the second region in a j-th reference preset region;

$$V2 = \frac{\sum_{i=1}^{S} V_i e^{-aL_i}}{\sum_{i=1}^{S} e^{-aL_i}} \tag{2}$$

where S is the number of reference preset regions associated with the first pixel, S≥i≥1, a is a first empirical value, $V_i$ is the reference preset data voltage obtained based on the target grayscale value and the Gamma curve corresponding to the i-th reference preset region, and $L_i$ is a distance between the first pixel and the second region in the i-th reference preset region;

$$V2 = \begin{cases} \frac{\sum_{i=1}^{S} V_i e^{-a(L_i-b)}}{\sum_{i=1}^{S} e^{-aL_i}}, & L > b \\ \frac{\sum_{i=1}^{S} V_i}{S}, & L < b \end{cases} \tag{3}$$

where S is the number of the reference preset region associated with the first pixel, S≥i≥1, a is the first empirical value, b is a second empirical value, $V_i$ is the reference preset data voltage obtained based on the target grayscale value and the Gamma curve corresponding to the i-th reference preset region, L is the distance between the first pixel and the second region in each reference preset region associated with the first pixel, and $L_i$ is the distance between the first pixel and the second region in the i-th reference preset region.

27. A chip, wherein the chip is used for executing the brightness compensation method according to claim 21.

* * * * *